(12) United States Patent
Tezuka et al.

(10) Patent No.: US 7,391,765 B2
(45) Date of Patent: Jun. 24, 2008

(54) CONGESTION CONTROL SYSTEM FOR VOIP NETWORK

(75) Inventors: Yasuo Tezuka, Yokohama (JP); Ryuji Ishikawa, Kawasaki (JP); Masataka Sakata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1072 days.

(21) Appl. No.: 10/116,929

(22) Filed: Apr. 5, 2002

(65) Prior Publication Data

US 2003/0107991 A1 Jun. 12, 2003

(30) Foreign Application Priority Data

Dec. 12, 2001 (JP) .............................. 2001-378993

(51) Int. Cl.
*H04L 12/66* (2006.01)
(52) U.S. Cl. .................. 370/356; 370/229; 370/310; 370/392; 370/401; 370/429
(58) Field of Classification Search ......... 370/229–237, 370/395.21, 289–394, 401, 410, 395.2, 412, 370/429
See application file for complete search history.

(56) References Cited

U.S. PATENT DOCUMENTS

| 6,381,242 | B1 * | 4/2002 | Maher et al. ................. 370/394 |
| 6,424,657 | B1 * | 7/2002 | Voit et al. .................... 370/412 |
| 6,449,251 | B1 * | 9/2002 | Awadallah et al. ........... 370/229 |
| 6,452,915 | B1 * | 9/2002 | Jorgensen ................... 370/338 |
| 6,456,630 | B1 * | 9/2002 | Packer et al. ................. 370/466 |
| 6,515,963 | B1 * | 2/2003 | Bechtolsheim et al. ...... 370/229 |
| 6,628,629 | B1 * | 9/2003 | Jorgensen ................... 370/322 |
| 6,640,248 | B1 * | 10/2003 | Jorgensen ................... 709/226 |
| 6,687,245 | B2 * | 2/2004 | Fangman et al. ............ 370/356 |
| 6,865,185 | B1 * | 3/2005 | Patel et al. .................. 370/412 |
| 7,002,919 | B1 * | 2/2006 | El-Sayed .................... 370/252 |
| 7,042,841 | B2 * | 5/2006 | Abdelilah et al. ........... 370/229 |
| 7,068,647 | B2 * | 6/2006 | Fangman et al. ............ 370/352 |
| 7,082,133 | B1 * | 7/2006 | Lor et al. .................... 370/392 |
| 7,133,362 | B2 * | 11/2006 | Chu et al. ................... 370/230 |
| 2001/0024452 | A1 * | 9/2001 | Liu et al. .................... 370/468 |
| 2002/0143948 | A1 * | 10/2002 | Maher et al. ................ 709/226 |

FOREIGN PATENT DOCUMENTS

| CN | 1267419 | 9/2000 |
| JP | 11-004292 | 1/1999 |
| JP | 11-88337 | 3/1999 |
| JP | 2000-099665 | 4/2000 |
| JP | 2000-349769 | 12/2000 |
| WO | 99/04536 | 1/1999 |

OTHER PUBLICATIONS

NTT Technical Journal. Information Magazine for Corporate Group to Learn Global Information Sharing Technologies. Mar. 1, 2001, vol. 13, No. 3.

* cited by examiner

*Primary Examiner*—Edan Orgad
*Assistant Examiner*—Venkatesh Haliyur
(74) *Attorney, Agent, or Firm*—Katten Muchin Rosenman LLP

(57) ABSTRACT

A system according to this invention executes congestion control for monitoring a packet flow which passes through a relay router in a VoIP network and in which a packet is transferred with a predetermined priority, and for, when congestion is generated by generation of a new packet flow, maintaining a transfer state of a packet of a packet flow established before the new packet flow is generated and transferred with the predetermined priority.

28 Claims, 25 Drawing Sheets

CONGESTION CONTROL SYSTEM FOR VOIP NETWORK

BACKGROUND OF THE INVENTION

1. Field of the Invention

The present invention relates to a so-called VoIP (Voice over Internet Protocol) technique which transfers audio (sound or voice) data by using an IP network and a technique which minimizes an audio quality deterioration factor such as a packet loss or jitter which is generated by congestion in a relay router.

2. Description of the Related Art

In recent years, transition from audio communication by STM exchange to audio communication by the VoIP technique using an IP network (IPNW) is rapidly advanced. FIG. 22 is a diagram showing a VoIP network. In FIG. 22, the VoIP network is constituted by a VoIP gateway (VoIP-GW), a CA (Call Agent: also called a "gate keeper"), and a relay router. The VoIP-GW is generally located between a PSTN (Public Switched Telephone Network) and an IPNW. The VoIP-GW transmits an audio packet (voice packet) obtained by packeting PCM (Pulse Code Modulation) audio data from the PSTN to the IPNW side or converts the packet from the IPNW into PCM audio data and transmits the PCM audio data to the PSTN. An RTP/UDP is used as an upper layer of the IP layer of an audio packet. A calling user and a called user are discriminated from each other by using an UDP-Port number. A CA executes call control for outgoing/incoming of calls or the like with the PSTN. As shown in FIG. 22, when an IP telephone is directly accommodated in an IP network, a CA executes call control the IP telephone based on H. 323(In this case, the IP telephone is connected with the IP network via an edge router). In the call control based on H. 323, the CA designates the IP address of the VoIP-GW of a destination, UDP-Port, codec format (e.g., G. 711, G. 723, G729), and the like. On the other hand, the CA controls the VoIP-GW by using, e.g., Megaco (Media Gateway Control). The relay router executes a relaying (forwarding) operation of an audio packet transmitted and received by the VoIP-GW and an edge router and an IP packet of other data.

When audio data is transferred by using an IP network, it is important how to reduce audio deterioration caused by packet loss, jitter, and the like while keeping real-time properties. In a conventional IP network, in general, Differentiated Service (Diff-serv) using IP-ToS (Type of Service) or QoS (Quality of Service) control by an RSVP (Resource Reservation Protocol) for band reservation control is executed.

FIG. 23 is a diagram showing priority control executed by the Diff-serv. In the Diff-serv, a relay router has a plurality of cues to which predetermined priorities (e.g., "high priority", "intermediate priority", and "low priority" are assigned. The relay router refers to the values of ToS set in the headers of the received packets and distributes the received packets to the cues according to the priorities corresponding to the ToS values. Thereafter, the relay router executes read control according to the priorities. At this time, a packet set in the "high priority" is preferentially read out and transferred to the next hop. In this manner, the packets having the "high-priority" are restrained being delayed. When the VoIP technique is applied, ToS corresponding to a "high priority" is set in an audio packet such that the audio packet has a priority higher than that of a data packet.

However, the Diff-serv is a technique in order to discriminate an audio packet flow from other data flows on the basis of priorities (for example, a high priority is given to an audio packet, and low priorities are given to the other data packets). The Diff-serv does not guarantee audio flow bands required for telephonic communication (audio communication) every telephonic communication. For this reason, as shown in FIG. 24, when congestion is generated in a flow distributed with high priority, packet loss (wasting or discarding an audio packet caused by an overflow of cues) is generated in each audio flow. Quality deterioration may be caused by mutual influences.

On the other hand, an RSVP reserves resources such as a band and a buffer between ends (end-to-end) through an IPNW to implement QoS control. For this reason, as shown in FIG. 25, a connection is set between ends (end-to-end). Band reservation control executed by an RSVP is executed in all the relay routers which relay a packet transferred on this connection to execute flow discrimination, band monitor, and the like.

However, the VoIP is an application which has a large number of low-band flows and which frequently executes call connection/disconnection. For this reason, when the VoIP is handled by the RSVP, a relay router must frequently execute the RSVP and must execute band monitor or the like based on the RSVP. Therefore, a load on the relay router increases. In addition, if a scale of the network increases and relay routers on an IP connection increase, QoS control by the RSVP increases and becomes complex. As described above, the QoS control executed by the RSVP has a problem in scalability. The QoS control by the RSVP cannot be actually employed by a large-scale network such as a carrier network.

SUMMARY OF THE INVENTION

It is an object of the present invention to provide a congestion control system for a VoIP network, which can present audio communication having desired quality by a method that is simpler than a conventional method.

The present invention employs the following configurations to solve the above problem.

More specifically, according to a first aspect of the present invention, a congestion control system for a VoIP network includes: a monitor unit for monitoring a packet flow which passes through a relay router in a VoIP network and in which a packet is transferred with a predetermined priority; and a congestion control unit for, when congestion is caused by the generation of a new packet flow, for executing congestion control for maintaining a state of a packet flow that is set the predetermined priority and that has been establishing before the congestion is caused.

The first aspect preferably has a configuration in which the priority of the new packet flow is changed into a priority that is lower than the predetermined priority by the congestion control.

The first aspect preferably has a configuration in which the new packet flow is disconnected by the congestion control.

According to the first aspect, when a new packet flow passing through a relay router and having a predetermined priority is set, if congestion is caused, congestion control is executed to lower or disconnect the priority of the new packet flow. In this manner, the new packet flow does not have an influence (accumulation of a packet, packet wasting caused by overflow, and the like) on a packet flow which has been established already and which has a predetermined priority. For this reason, to the packet flow that has been established already, packet transfer is executed in a preferable state. Therefore, telephonic communication using an audio packet transferred in the packet flow is presented with desired audio quality.

The first aspect preferably has a configuration in which the monitor unit holds a sum total of a used band of at least one packet flow passing through the relay router and set the predetermined priority and determines that congestion is caused when the sum total exceeds a predetermined allowable value due to generation of a new packet flow.

The first aspect preferably has a configuration in which the congestion control system further includes: a flow specifying information storage unit for storing flow specifying information for specifying a packet flow which passes through the relay router and set the predetermined priority; a sum total storage unit for storing a sum total of a used band of at least one packet flow having the flow specifying information of which is stored in the flow specifying information storage unit by the flow specifying information; and an allowable value storage unit for storing an allowable value of a used band used the packet flow of the predetermined priority, when the relay router receives a packet, the monitor unit specifies a priority of the packet, when the specified priority is the predetermined priority, the monitor unit refers to the flow specifying information storage unit, and when the flow specifying information of the packet is not stored in the flow specifying information storage unit, the monitor unit calculates a used band of the packet flow of the packet, adds the calculated band value to the sum total stored in the sum total storage unit, and determines whether the addition result exceeds the allowable value stored in the allowable value storage unit or not.

The first aspect preferably has a configuration in which all packet flows in which packets are transferred with the predetermined priority are audio packet flows, and when the relay router receives an audio packet of a new generated audio packet flow, the monitor unit calculates a used band of the audio packet flow of the audio packet on the basis of an RTP payload type and an IP packet length included in the audio packet.

A second aspect of the present invention is a setting system for an audio packet flow in a VoIP network. This system includes: a calling VoIP gateway for setting an audio packet flow of a first direction extending from the calling side to the called side between the calling VoIP gateway and a called VoIP gateway to establish a telephonic communication call through the VoIP network; a called VoIP gateway for setting an audio packet flow in a second direction extending from the called side to the calling side between the called VoIP gateway and the calling VoIP gateway to establish the telephonic communication call; and a relay router for relaying audio packets transferred on the audio packet flows in the first and second directions, and wherein, before audio packet flows in the first and second directions are set, the calling VoIP gateway transmits a test packet which has a predetermined priority set for the audio packet flows and is transferred on the audio packet flows to the called VoIP gateway, the relay router monitors a packet flow which passes through the relay router and which is transferred with the predetermined priority, receives the test packet in the first and second directions until the test packet is turned back to the calling VoIP gateway by way of the called VoIP gateway, uses the received test packet to determine whether congestion is caused by setting the audio packet flows in the first and second direction or not, and changes the predetermined priority set for the test packet into a priority lower than the predetermined priority when the congestion is caused, when the priority set for the test packet turned back to the calling VoIP gateway is changed, the calling VoIP gateway changes the priority of the audio packet flow in the first direction into a priority lower than the predetermined priority or disconnects the audio packet flow in the first direction, and the called VoIP gateway changes the priority of the audio packet flow in the second direction into a priority that is set for the audio packet flow in the first direction when the priority of the audio packet flow in the first direction is changed into a priority lower than the predetermined priority, or disconnects the audio packet flow in the second direction when the audio packet flow in the first direction is disconnected.

A third aspect of the present invention is a VoIP gateway functions as a calling VoIP gateway. The VoIP gateway device includes: a setting unit for setting a new audio packet flow extending from a calling side to a called side and having a predetermined priority between a calling VoIP gateway and a called VoIP gateway to establish a telephonic communication call through a VoIP network; a inquiring unit for inquiring of a subscriber of the telephonic communication call about control contents of the new audio packet flow when congestion caused by setting the new audio packet flow is detected by a relay router for relaying an audio packet transferred on the new audio packet flow; and a control unit for changing the priority set for the new audio packet flow into a priority lower than the predetermined priority or disconnecting the new audio packet flow according to a reply from the subscriber.

A fourth aspect of the present invention is a VoIP gateway functions a calling VoIP gateway. The VoIP gateway device includes: a transmission unit for, when an audio packet flow in a first direction extending from a call side to a called side and an audio packet flow in a second direction extending from the called side to the calling side are set between a calling VoIP gateway and a called VoIP gateway to establish a telephonic communication call through a VoIP network, transmitting a test packet having a predetermined priority set for the audio packet flows in the first and second directions and transferred on these audio packet flows; a reception unit for receiving the test packet turned back to the calling VoIP gateway by way of the called VoIP gateway to the reception unit; and a control unit for, when the predetermined priority set for the received test packet is changed into another priority, changing a priority of the audio packet flow in the first direction into a priority lower than the predetermined priority, or disconnecting the audio packet flow in the first direction.

A fifth aspect of the present invention is a relay router. The relay router includes: a monitor unit for monitoring a packet flow which passes through a relay router in a VoIP network and in which a packet is transferred with a predetermined priority; and a congestion control unit for, when congestion is caused by the generation of a new packet flow, for executing congestion control for maintaining a state of a packet flow that is set the predetermined priority and that has been establishing before the congestion is caused.

According to the present invention, audio communication having desired quality is presented by a method simpler than a conventional method.

DESCRIPTION OF THE PREFERRED EMBODIMENTS

Embodiments of the present invention will be described below. The configurations of the embodiments are examples. The present invention is not limited to the configurations of the embodiments.

Figure 1:
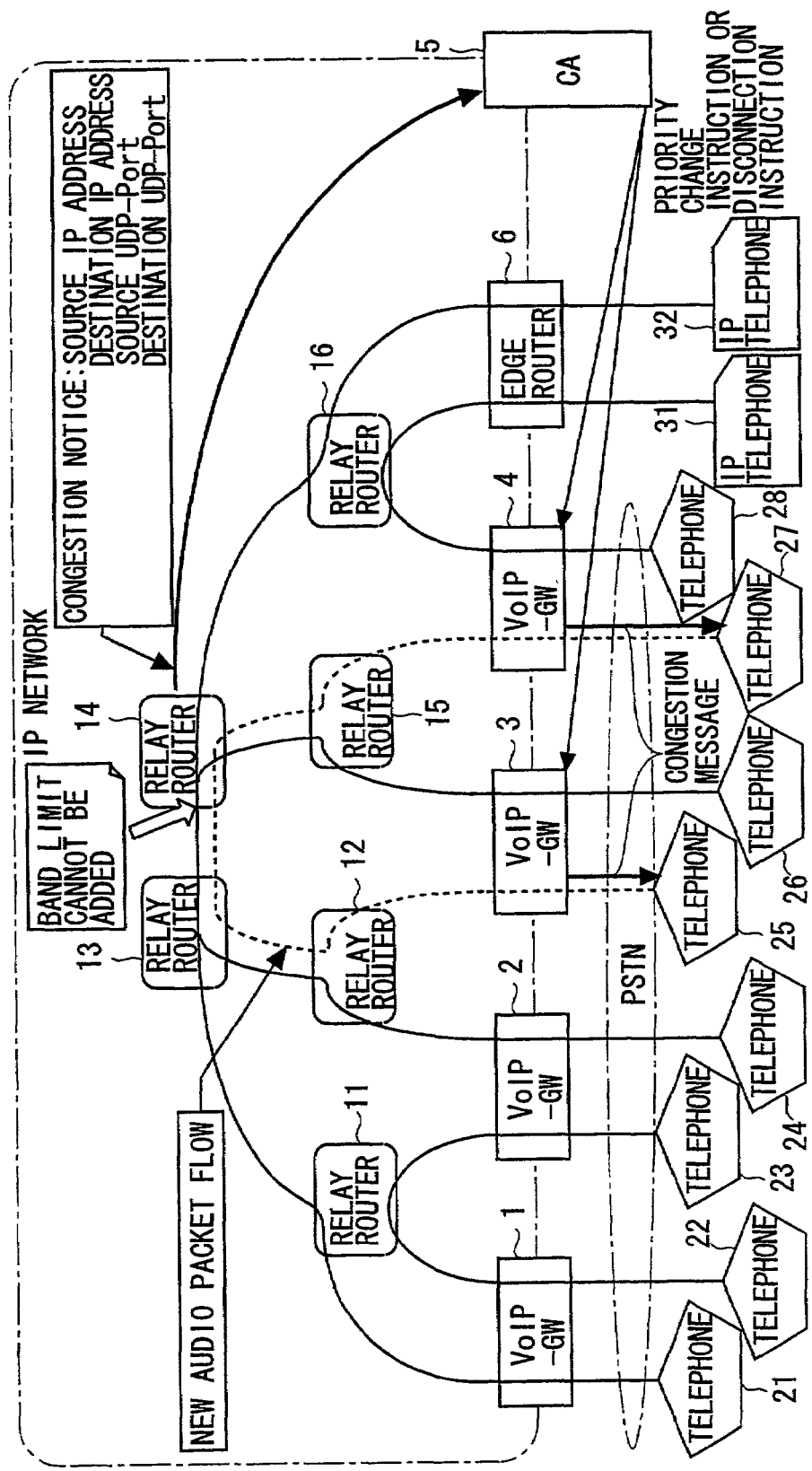
FIG. 1 is a diagram showing a first method in which a relay router, which detects congestion notifies a CA that the congestion is generated, and the CA that receives notice controls a VoIP-GW.
Figure 2:
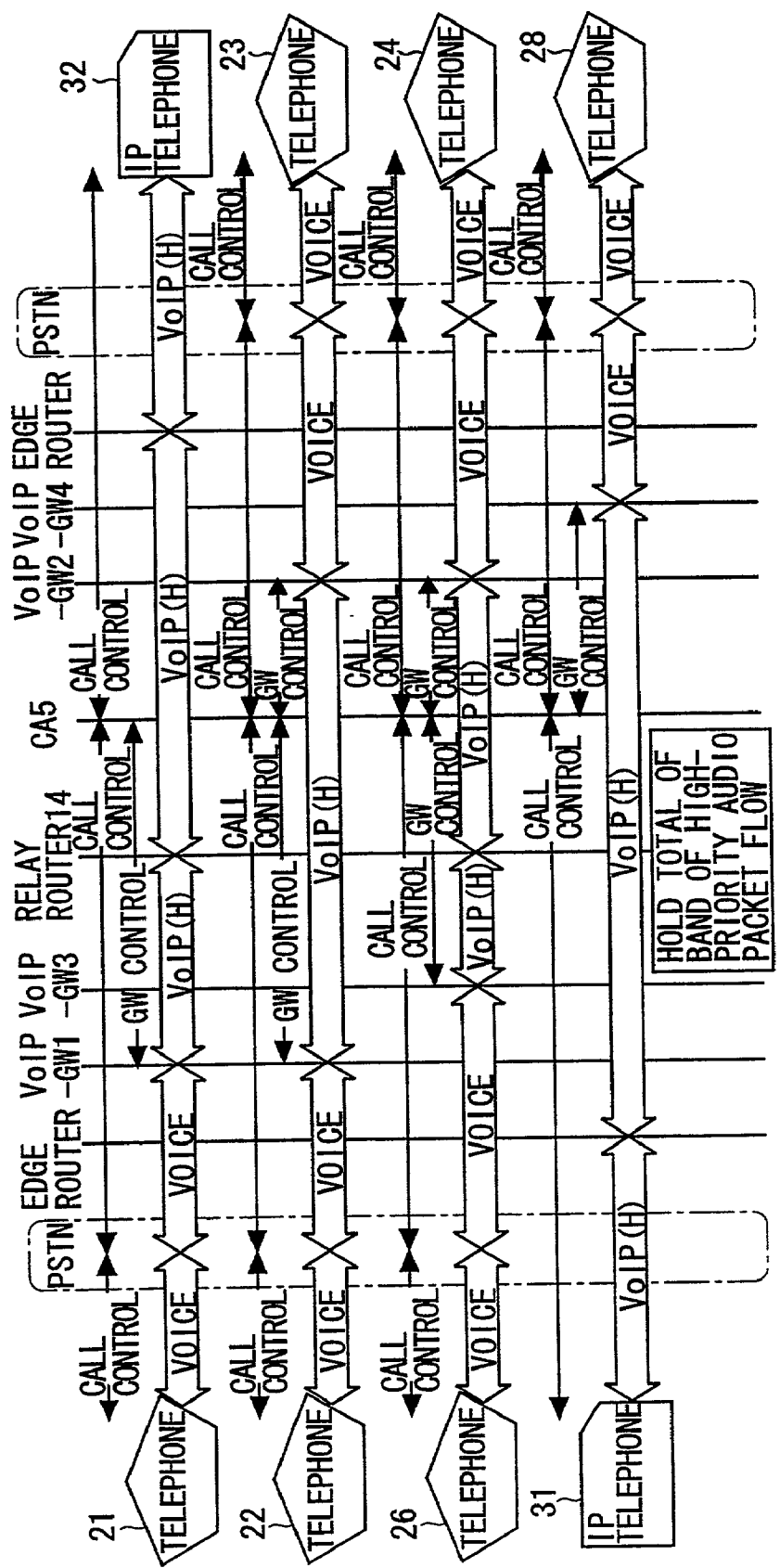
FIG. 2 is a diagram showing a sequence of the first method shown in FIG. 1.
Figure 3:
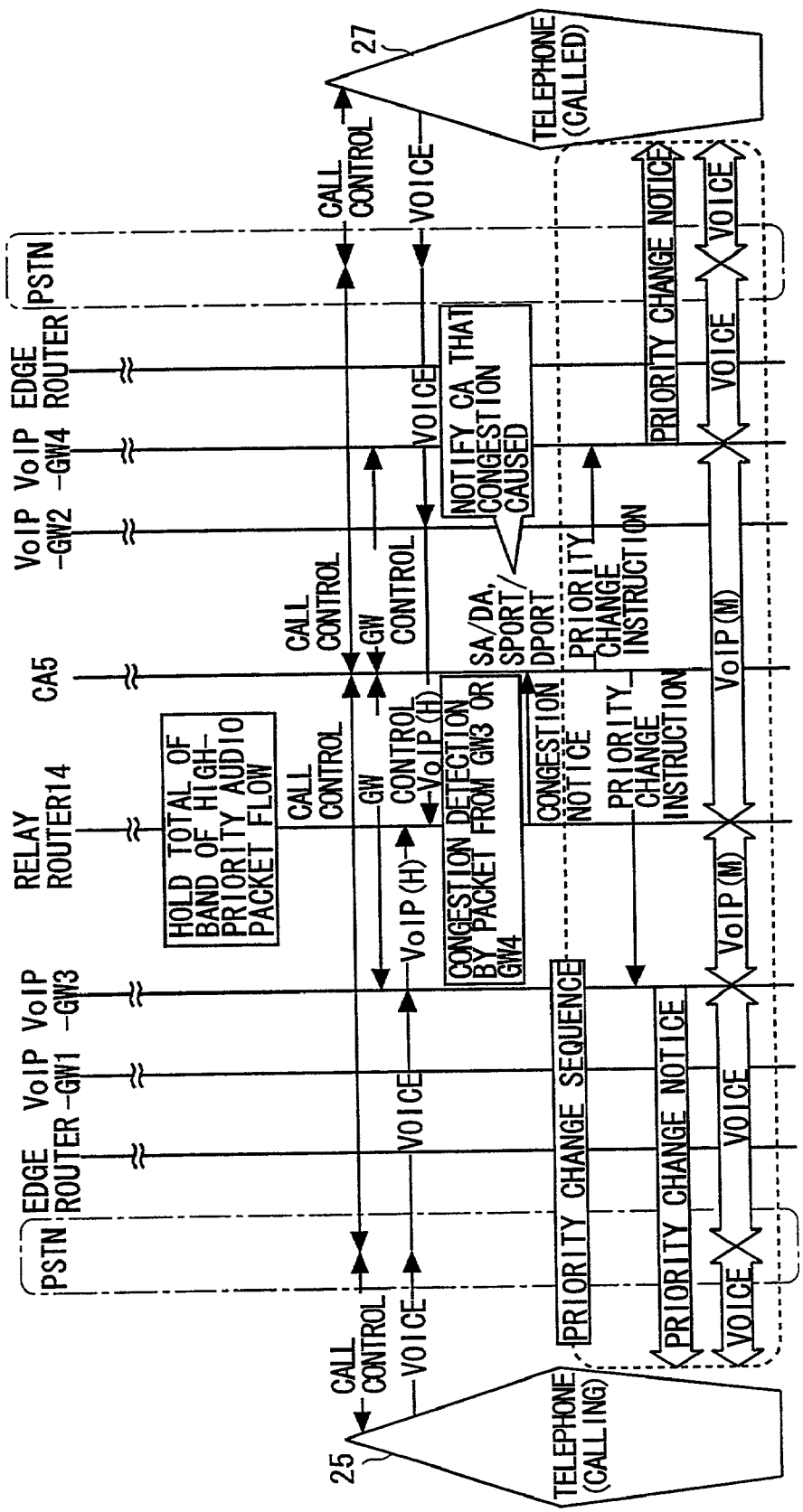
FIG. 3 is a diagram showing a sequence (priority change sequence) of the first method shown in FIG. 1.
Figure 4:
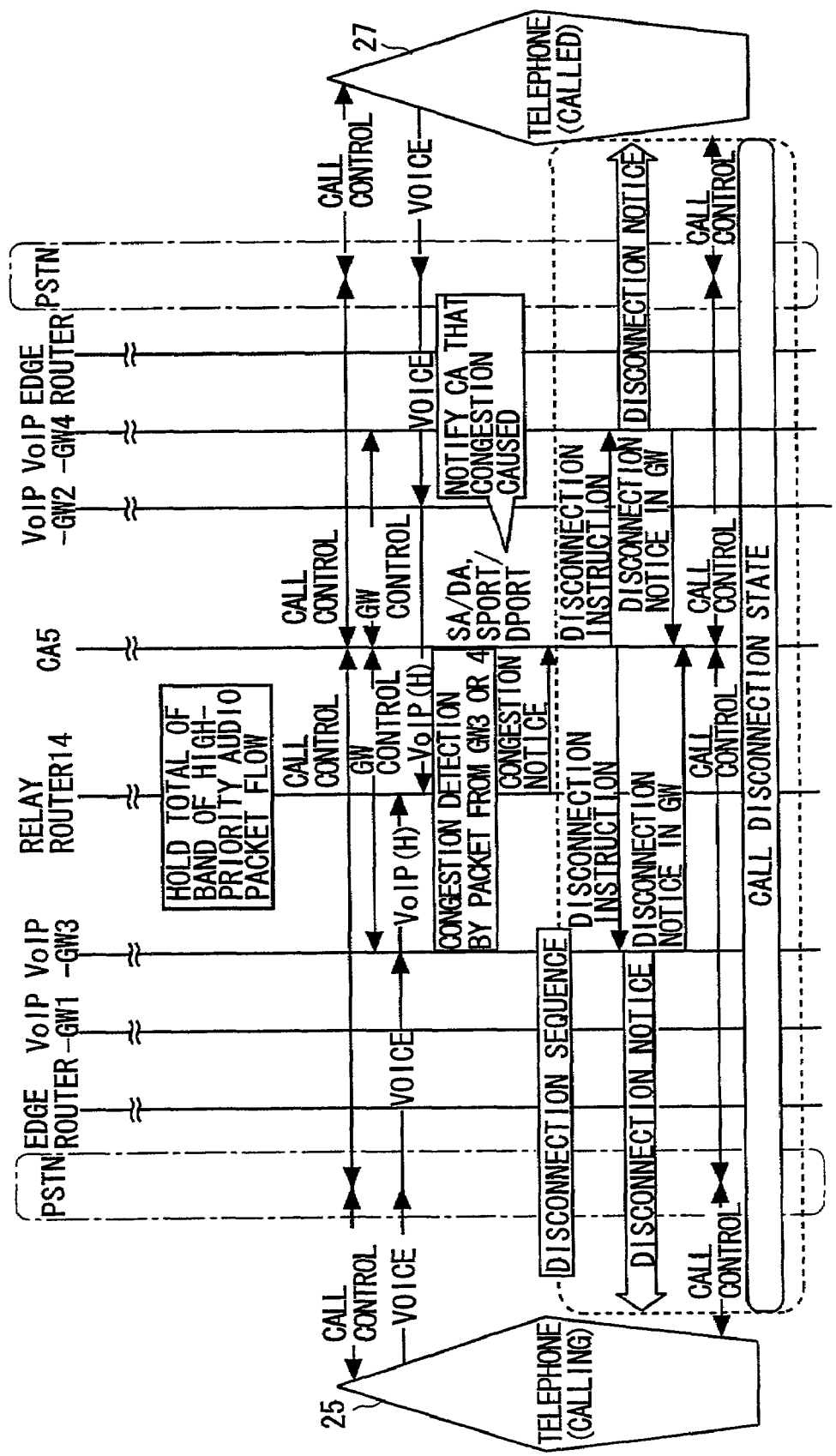
FIG. 4 is a diagram showing a sequence (disconnection sequence) of the first method shown in FIG. 1.

FIG. 1 is a diagram showing a first method that a relay router which detects congestion notifies a CA that the congestion is caused, and the CA which receives the notice controls a VoIP-GW in a VoIP network to which the present invention is applied. FIGS. 2, 3, and 4 are diagrams showing sequences of the first method shown in FIG. 1.

The VoIP network to which the present invention is applied, as shown in FIG. 1, comprises a plurality of VoIP-GW (to be referred to as a "GW" hereinafter), a plurality of relay routers, and a CA. In addition, the VoIP network can accommodate an IP telephone through an edge router. FIG. 1 illustrates GWs 1 to 4, relay routers 11 to 16, a CA 5, and an edge router 6 that accommodates a plurality of IP telephones 31 and 32.

The VoIP network has the same function as that of a conventional VoIP network except for a configuration related to priority control of an audio packet. More specifically, a function which establishes telephonic communication (call: audio line) between subscriber telephones, between a telephone and an IP telephone, and between IP telephones, a function in which each GW converts PCM audio data from a PSTN into an audio packet to transmit the audio packet to an IPNW or converts an audio packet from the IPNW into PCM audio data to transmit the PCM audio data to the PSTN, a function in which a relay router forwards an audio packet depending on the destination of the audio packet, and the like are the same as those of a conventional VoIP network.

When telephonic communication is executed between the telephones, between the telephone and the IP telephone, or the IP telephones, two audio packet flows for transferring audio packets for the telephonic communication are generated. Each of the GWs sets a value representing the highest priority (high-priority (H)) in a ToS (Type of Service: see FIG. 11(A)) of the IP header of the audio packet transferred on each of the audio packet flows, in principle (by default). Each of the relay router executes a priority control by Diff-serv on the basis of the priority (ToS value) set for the audio packets. In this manner, the real-time properties of audio communication can be acquired.

Furthermore, in the VoIP network to which the present invention is applied, the following QoS control is executed. For example, as shown in FIG. 1, when telephonic communications are respectively executed between the telephone 21 and the IP telephone 32, between the telephone 22 and the telephone 23, between the telephone 26 and the telephone 24, and between the IP telephone 31 and the telephone 28, a process (call control and GW control) as shown in the sequence of FIG. 2 is executed in order to establish one or more telephonic communication call(s).

The telephonic communication call is established between the telephone 21 and the IP telephone 32 by the call control between the PSTN and the CA 5, the call control between the CA 5 and the IP telephone 32, and the control of the VoIP-GW 1 by the CA 5. At this time, in the VoIP network, two audio packet flows (VoIP) tracing a route of "the GW 1—the relay router 11—the relay router 13—the relay router 14—the relay router 16—the edge router 6" in the forward and backward directions (first and second directions) are generated (see FIG. 1).

Also, when the telephonic communication call is established between the telephone 22 and the telephone 23, two audio packet flows tracing a route of "the GW 1—the relay router 11 the GW 2" in the forward and backward directions are generated (see FIG. 1).

Further, when the telephonic communication call is established between the telephone 26 and the telephone 24, two audio packet flows tracing a route of "the GW 3—the relay router 15—the relay router 14—the relay router 13—the relay router 12—the GW 2" in the forward and backward directions are generated (see FIG. 1).

Further when the telephonic communication call is established between the IP telephone 31 and the telephone 28, in the VoIP network, two audio packet flows tracing a route of "the edge router 6—the GW 4" in the forward and backward directions are generated (see FIG. 1).

Each of the relay routers 11 to 16 calculates and holds a sum total of bands used by one or more audio packet flow(s) that is set a predetermined priority and passes through the corresponding router (itself). The predetermined priority is, e.g., the highest priority "high-priority (H)". It is desirable that the "high-priority (H)" is set for only the audio packet flows. However, the "high-priority (H)" may be set for both audio packet flows and data packet flows. For the sake of simple description, in the following description, the predetermined priority ("high priority (H)") is set for only an audio packet flow, and each of relay routers 11 to 16 calculates and holds a sum total of band(s) used by one or more packet flow(s) that is set for the "high priority (H)".

For example, when attention is paid to the relay router 14, the relay router 14 holds a sum total of a band for the telephonic communication (audio packet flows) between the telephone 21 and the IP telephone 32, and a band for the telephonic communication (audio packet flows) between the telephone 26 and the telephone 24.

Thereafter, as shown in FIG. 3, when the telephone 25 calls the telephone 27, the call control for connecting (establishing telephonic communication) the telephone 25 and the telephone 27 to each other is executed between the telephone 25 and the PSTN, between the PSTN and the CA 5, and between the PSTN and the telephone 27.

In addition, the CA 5 notifies the IP address and the UDP-Port number of an opposite GW to each of the GWs 3 and 4. In this manner, two new audio packet flows passing through the relay routers 15, 14, 13, and 12 are generated between the GWs 3 and 4. Then, each of the GWs 3 and 4 sets the "high-priority (H)" for the corresponding new audio packet flow.

Each of the relay routers 12, 13, 14, and 15, when detects an audio packet (audio packet from the GW 3 or audio packet from the GW 4) transferred on each of the new audio packet flows, executes congestion determination per audio packet. The congestion determination is executed by checking whether a sum total of bands used by "high-priority (H)" packet flows exceeds a value (threshold value of the congestion determination) set in advance by each relay router.

At this time, it is assumed that the sum total of the bands used by the "high-priority (H)" packet flows exceeds the threshold value of the congestion determination in the relay router 14 by generating a new "high-priority (H)" packet flow.

In this case, the relay router 14 notifies the CA 5 of causing the congestion. At this time, the relay router 14 extracts a source IP address (Source IP address), a destination IP address (Destination IP address), a source UDP-Port number (Source UDP-Port), and a destination UDP-Port number (Destination UDP-Port) from a header of an audio packet that is transferred on the new audio packet flow corresponding to the cause of the congestion, and gives a congestion notice including the source and destination IP addresses and the source and destination UDP-port numbers to the CA 5. In this manner, the CA 5 is able to specify the new audio packet flow corresponding to the cause of the congestion.

When the CA 5 receives the congestion notice, a priority change sequence (see FIG. 3) or a disconnection sequence (see FIG. 4) is executed. The CA 5 is able to select either the priority change sequence or the disconnection sequence, for example, the CA 5 selects either the priority change sequence or the disconnection sequence according to a predetermined setting (configuration) set for the CA 5 in advance. In addition, the CA 5 is able to have information of a priority for setting the audio packet flow corresponding to a target of the priority change sequence in advance, when the priority change sequence is executed, the priority which is had by the CA 5 is set for the target audio packet flow.

As shown in FIG. 3, when the priority change sequence is executed, the CA 5 instructs changing the priority of the audio packet flow to the GW (GW 3 and 4) related to the audio packet flow notified from the relay router 14. The instruction may include the priority (the changed priority), which is set for the target audio packet flow after the priority change sequence is executed. On the other hand, the GW may have the changed priority in advance instead of the CA 5.

Each of the GWs 3 and 4, when receives the instruction of priority change from the CA 5, gives a notice (congestion message (priority change notice)) that a priority is changed due to congestion to users (subscribers) (telephones 25 and 27). Thereafter, each of the GWs 3 and 4 changes the priority of the target audio packet flow corresponding to the instruction from the CA 5 into the priority instructed by the CA 5. For example, each of the GWs 3 and 4 changes the "high-priority (H)" into the "intermediate-priority (M)". More specifically, each of the GWs 3 and 4 sets the ToS value representing "intermediate-priority (M)" (or "low-priority (L)") lower than the "high-priority (H)" for the ToS field of the audio packet of the target audio packet flow.

By the above-mentioned priority change sequence, the priority of the audio packet flow related to the telephonic communication between the telephone 25 and the telephone 27 is lower than the "high-priority (H)". For this reason, in the relay router 14, the bands of packet flows distributed to the "high-priority (H)" decreases. Thereby, the congestion of the high-priority audio packet flow(s) is dissolves. Therefore, it is avoid from that influence of the congestion extends to one or more high-priority audio packet flow(s) relating to the telephonic communication(s) have been established from before the congestion happen. On the other wards, each of the high-priority telephonic communications has been established from before causing the congestion keeps preferably status.

On the other hand, as shown in FIG. 4, when the disconnection sequence is executed, the CA 5 instructs the GWs (GW 3 and 4) related to the audio packet flow notified from the relay router 14 to disconnect the audio packet flow.

Each of the GWs 3 and 4, when receives the instruction of disconnection from the CA 5, gives a notice (congestion message (disconnection notice) that the audio packet flow is disconnect by the congestion to users (subscribers) (telephones 25 and 27). Thereafter, each of the GWs 3 and 4 executes a disconnection process of the corresponding audio packet flow, and notifies the CA 5 that the disconnection process is completed. The CA 5, when receives the notice, executes call control for disconnecting a telephonic communication call between the telephone 25 and the telephone 27.

By the above-mentioned disconnection sequence, the audio packet flow related to the telephonic communication between the telephones 25 and 27 is disconnected. Thereby, as in the priority change, in the relay router 14, a value of sum total of band(s) of the high priority packet flow(s) decrease lower than the threshold value and the congestion is dissolved. Therefore, it is avoid from that the influence of the congestion extend to the high-priority audio packet flow(s) relating to the telephonic communication(s) have been established before the congestion occur.

For this reason, every call connection transferred in the VoIP network, without executing a band preservation protocol such as an RSVP and using a complex process such as band monitor in the relay router, VoIP transfer having audio quality which is close to audio quality of transfer executed by STM (Synchronous Transfer Mode) exchange is implemented by using a relatively simple method.

As the notice (method of notifying a congestion message) to a user, a method of executing notification by an audio message or a method of executing notification by using a signal such as a DTMF (Dual tone Multifrequency) can be applied.

Figure 5:
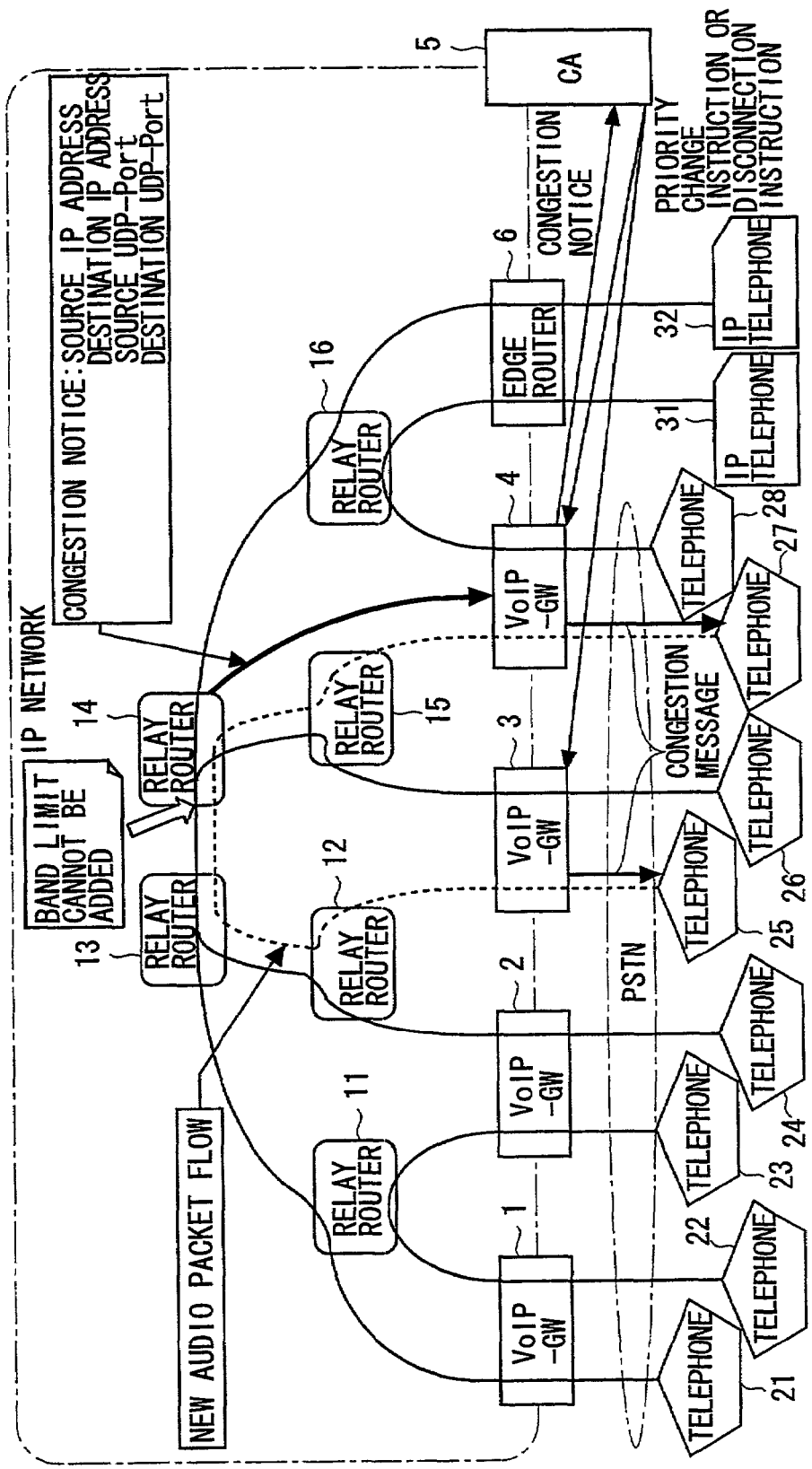
FIG. 5 is a diagram showing a second method in which a relay router, which detects congestion notifies a CA that the congestion is generated, and the CA that receives notice disconnects a call.
Figure 6:
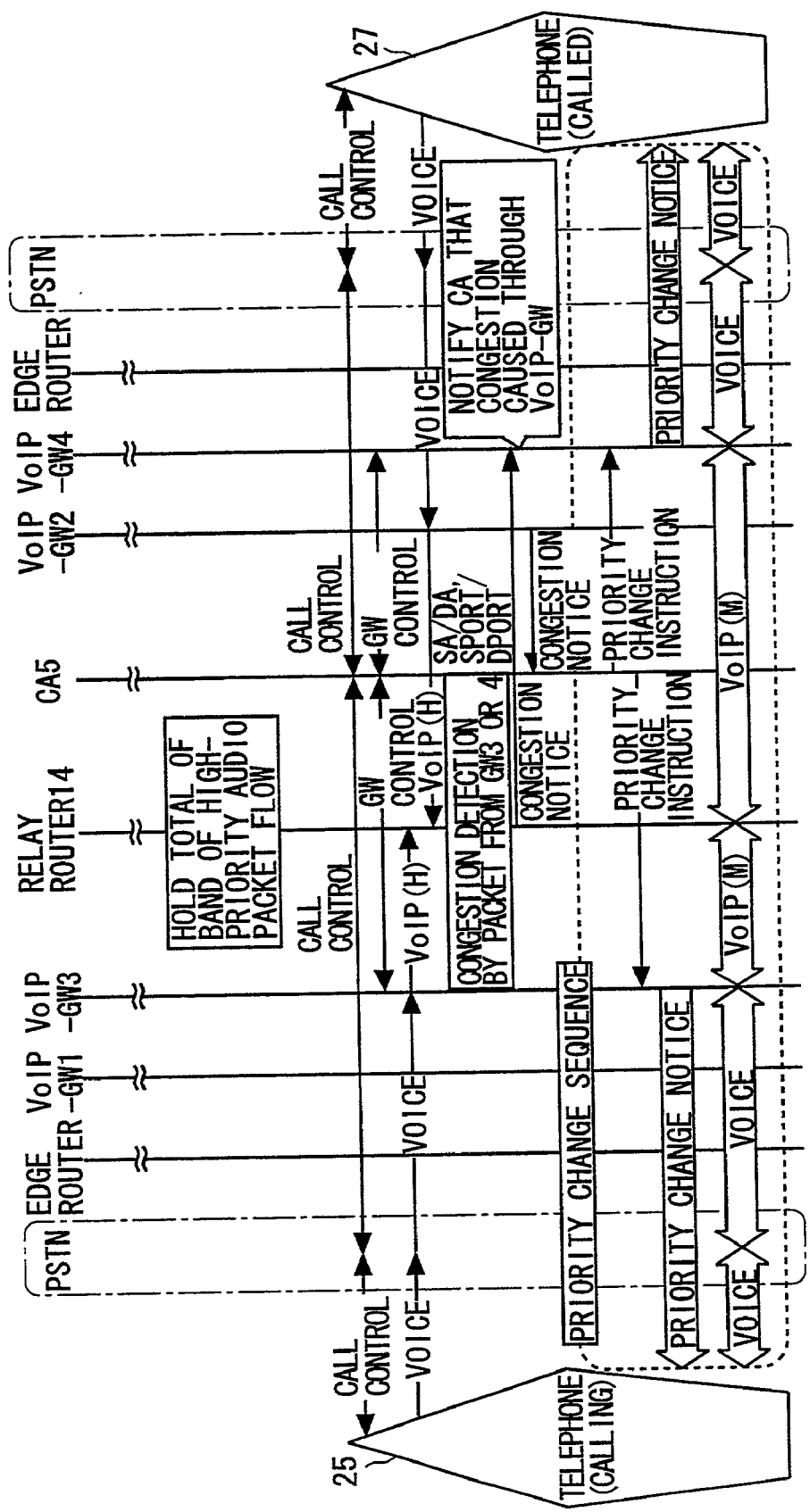
FIG. 6 is a diagram showing a sequence (priority change sequence) of the second method shown in FIG. 5.
Figure 7:
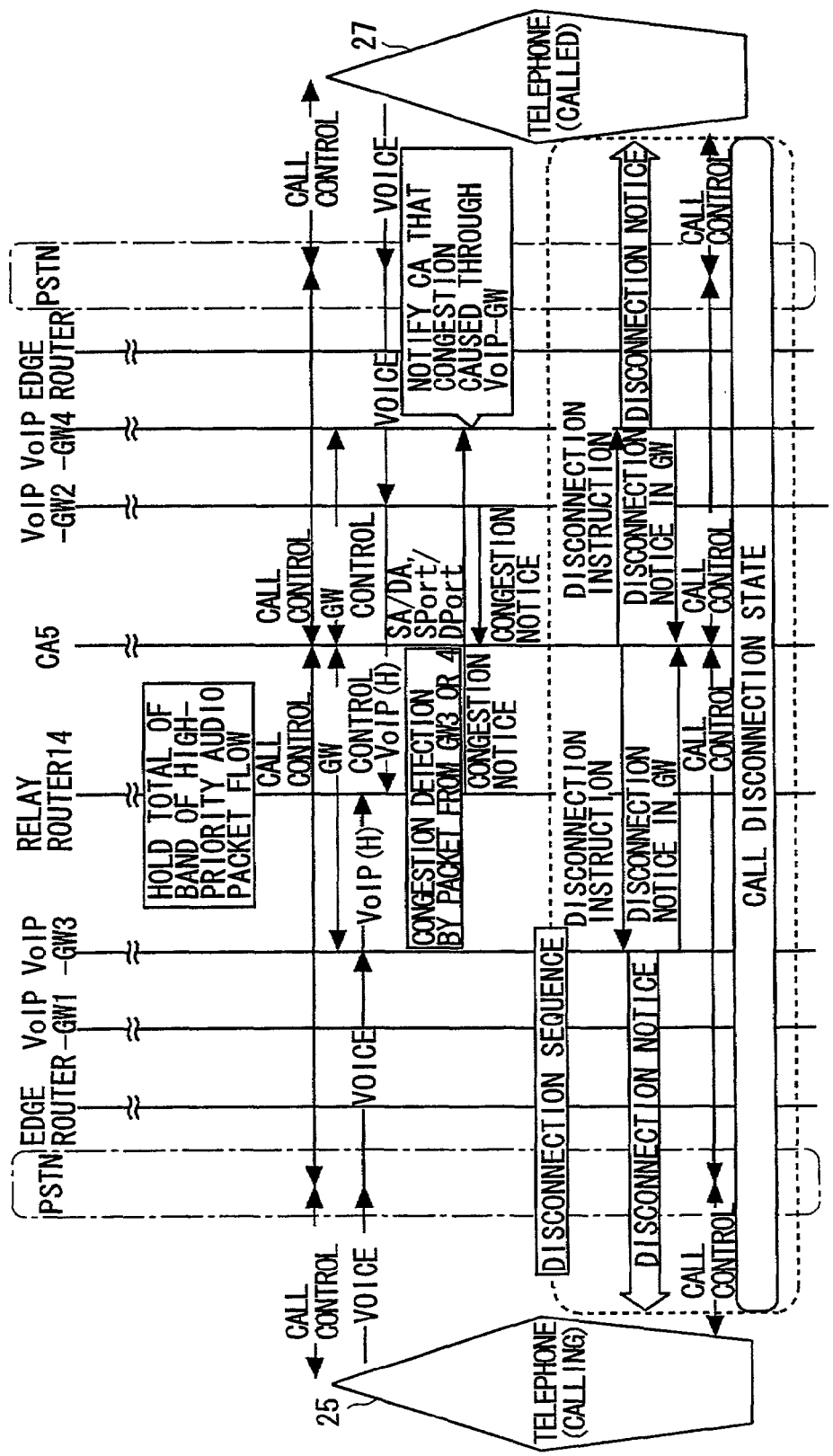
FIG. 7 is a diagram showing a sequence (disconnection sequence) of the second method shown in FIG. 1.

FIG. 5 is a diagram showing a second method in which a relay router, which detects congestion notifies a CA that the congestion is generated through a VoIP-GW, and the CA, which receives the notice controls the VoIP-GW. FIGS. 6 and 7 are diagrams showing sequences of the second method shown in FIG. 5.

For example, by call control and GW control shown in FIG. 2, as shown in FIG. 5, when telephonic communications are executed between the telephone 21 and the IP telephone 32, between the telephone 22 and the telephone 23, between the telephone 26 and the telephone 24, and the IP telephone 31 and the telephone 28, respectively, it is assumed that a new telephonic communication call is established between the telephone 25 and the telephone 27 and that new audio packet flows are generated between the GW 3 and the GW 4.

At this time, for example, it is assumed that the relay router 14 detects an audio packet related to a new audio packet flow from the GW 4 or the GW 3, executes the same congestion determination as that of the first method, and determines that a sum total of bands of "high-priority" exceeds the threshold value (new audio packet flow cannot be added as a "high-priority" audio packet flow).

In this case, the relay router 14 extracts a source IP address, a destination IP address, and a source UDP-Port number, and a destination UDP-Port number as information for specifying an audio packet flow which causes congestion from the audio packet (audio packet from the GW 4 in the examples in FIGS. 6 and 7) detected in the congestion determination.

The relay router 14 gives a congestion notice including the source/destination IP addresses and the source/destination UDP-Port numbers to the GW (GW 4 in the examples in FIGS. 6 and 7) serving as the source of the audio packet unlike the first method.

The GW 4 transfers the congestion notice from the relay router 14 to the CA 5. When the CA 5 receive the congestion notice, a priory change sequence or a disconnection sequence like the first method is executed according to the setting set in the CA 5 in advance. FIG. 6 shows the congestion determination and the priory change sequence by the relay router 14. FIG. 7 shows the congestion determination and the disconnection sequence by the relay router 14.

In the second method, when the relay router detects the congestion, the relay router only transmit the congestion notice to the GW corresponding to the destination IP address of the audio packet used for the congestion determination. The second method does not require the relay router to retain the IP address of the CA 5 or GW in advance as a destination of the congestion notice.

Figure 8:
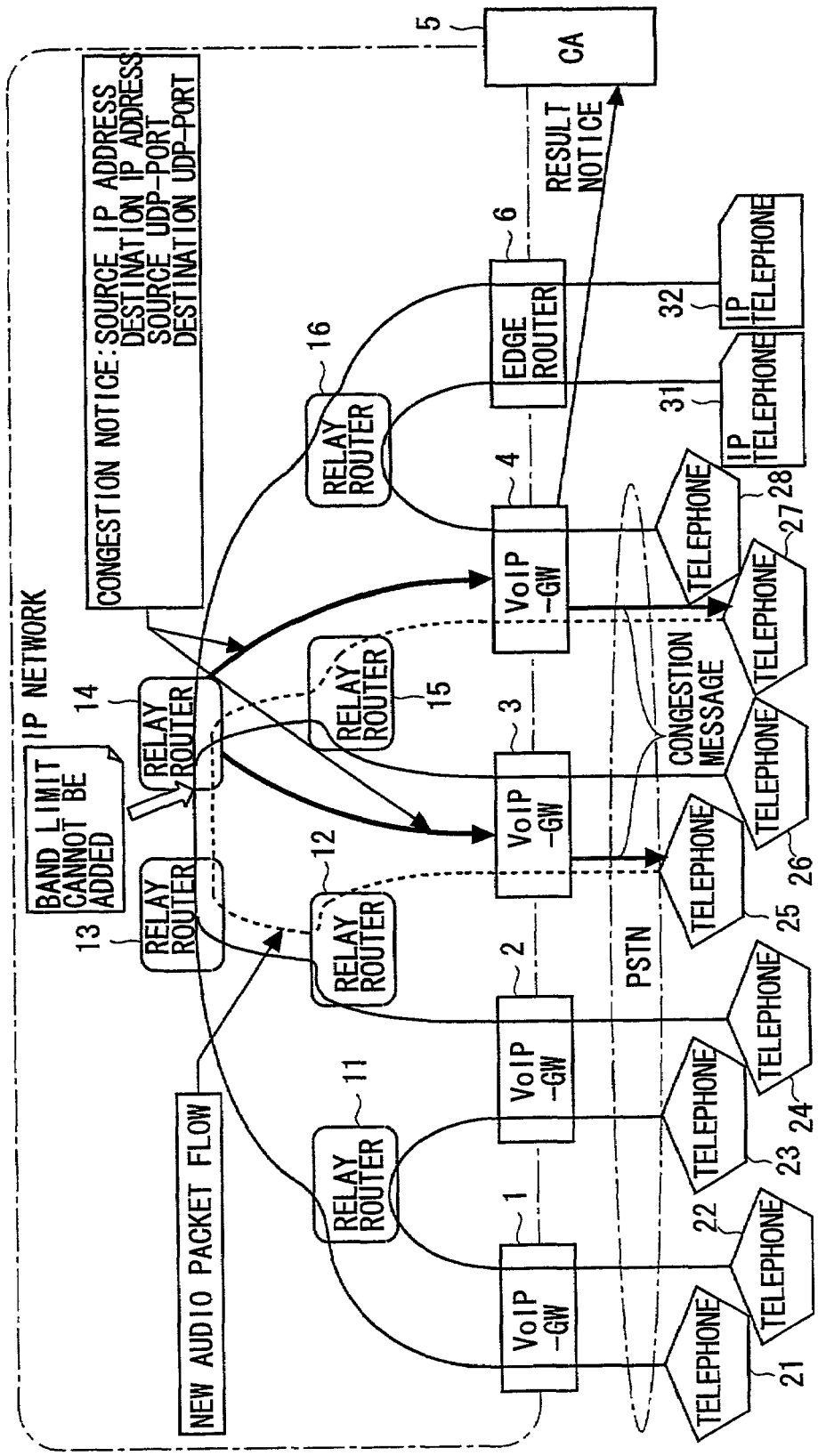
FIG. 8 is a diagram showing a third method in which a relay router, which detects congestion notifies a CA that the congestion is generated through a VoIP-GW, and the CA, which receives a notice controls the VoIP-GW.
Figure 9:
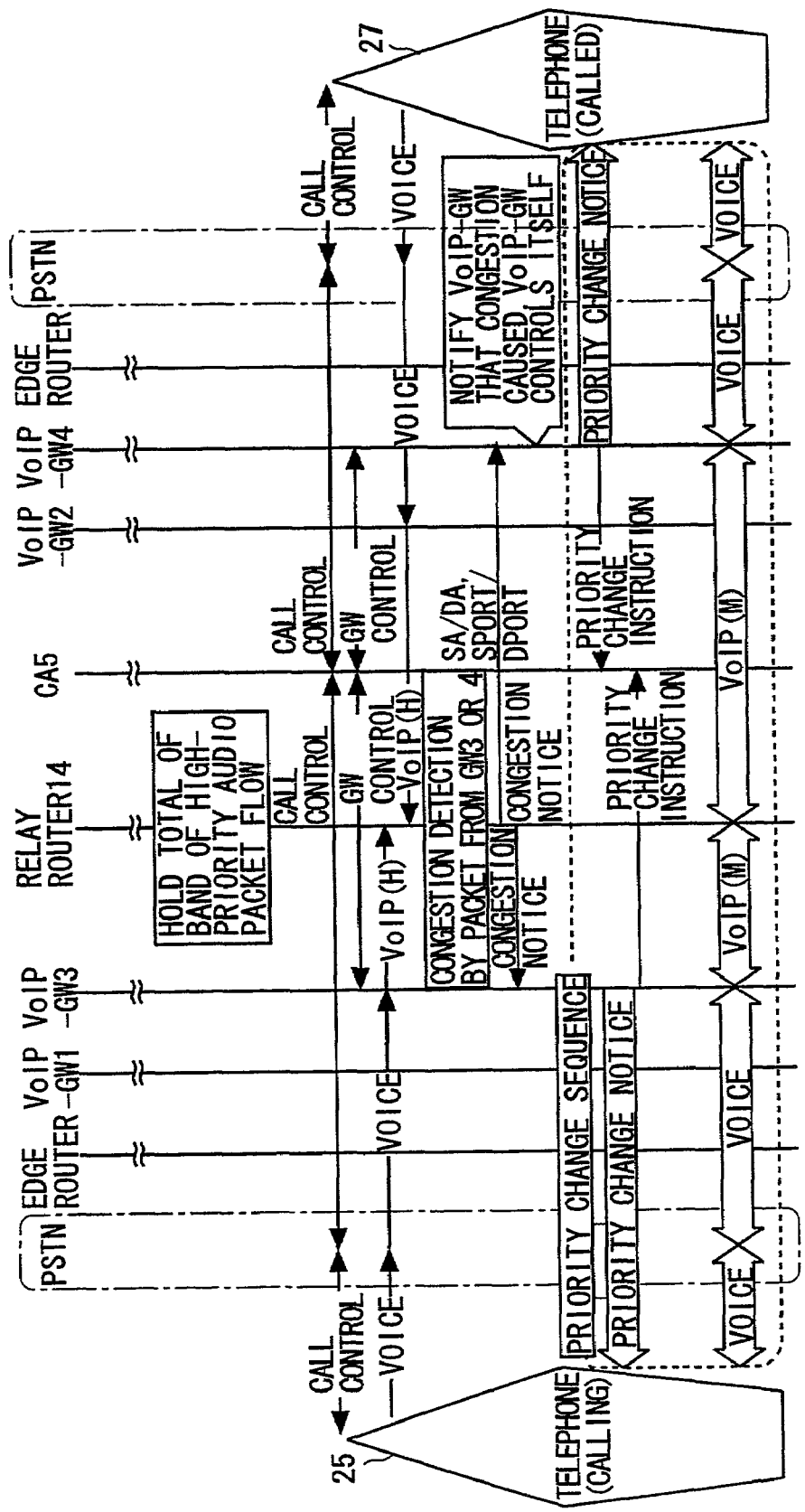
FIG. 9 is a diagram showing a sequence (priority change sequence) of the third method shown in FIG. 8.
Figure 10:
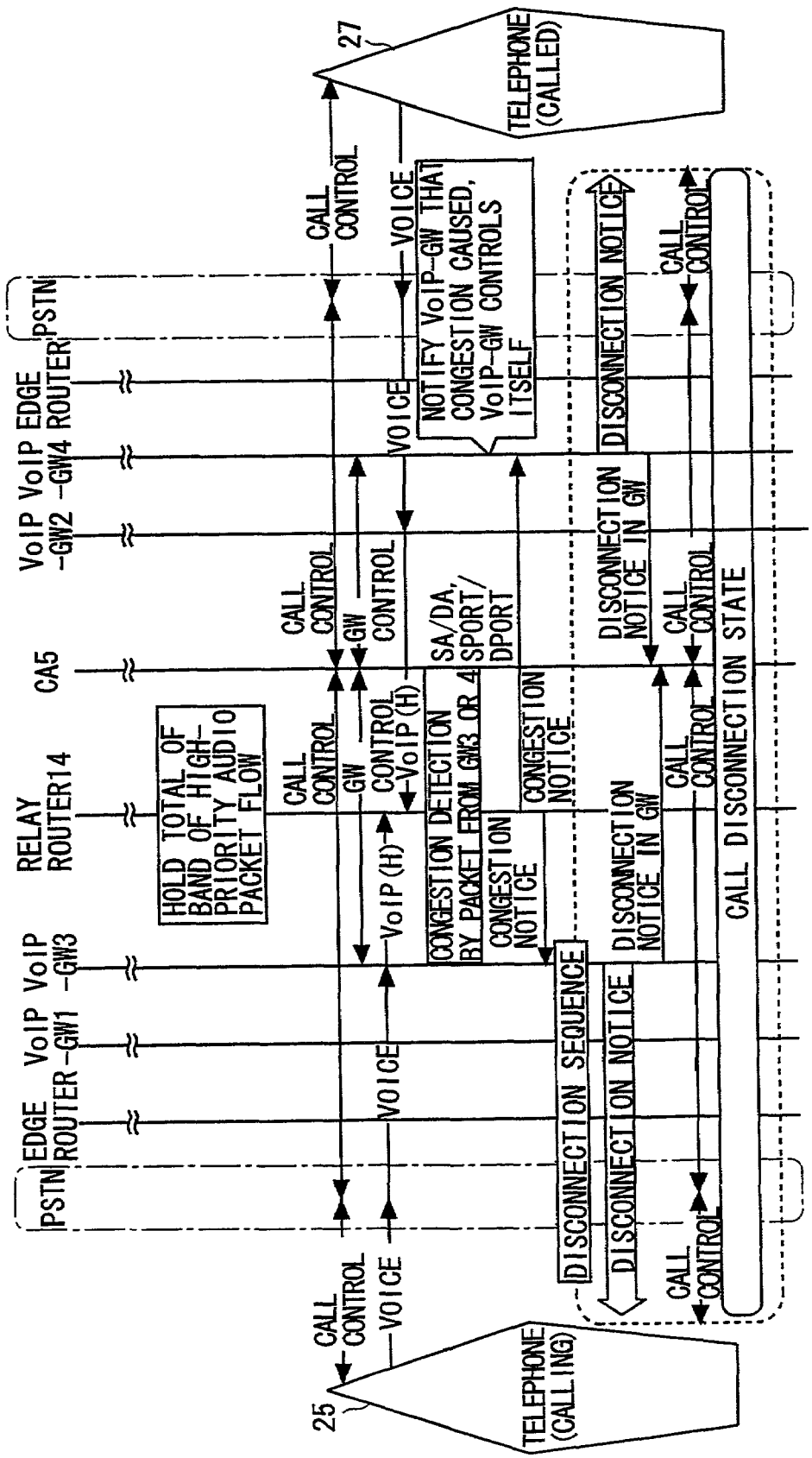
FIG. 10 is a diagram showing a sequence (disconnection change sequence) of the third method shown in FIG. 8.

FIG. 8 is a diagram showing a third method in which a relay router, which detects congestion notifies a VoIP-GW that the congestion is generated, and the VoIP-GW, which receives the notice controls autonomously. FIGS. 9 and 10 are diagrams showing sequences of the third method shown in FIG. 8. For example, by call control and GW control shown in FIG. 2, as shown in FIG. 8, when telephonic communications are executed between the telephone 21 and the IP telephone 32, between the telephone 22 and the telephone 23, between the telephone 26 and the telephone 24, and the IP telephone 31 and the telephone 28, respectively, it is assumed that a new telephonic communication call is established between the telephone 25 and the telephone 27 and that a new audio packet flow is generated between the GW 3 and the GW 4.

At this time, for example, it is assumed that the relay router 14 detects an audio packet related to a new audio packet flow from the GW 4 or the GW 3, executes the same congestion determination as that of the first method, and determines that a sum total of bands of "high-priority" exceeds the threshold value (new audio packet flow cannot be added as a "high-priority" audio packet flow).

In this case, the relay router 14 extracts a source IP address, a destination IP address, and a source UDP-Port number, and a destination UDP-Port number as information for specifying an audio packet flow which causes congestion from the audio packet (audio packet from the GW 4 in the examples in FIGS. 9 and 10) detected in the congestion determination.

The relay router 14 gives a congestion notice including the source/destination IP addresses and the source/destination UDP-Port numbers to the GWs (GWs 3 and 4 in the examples in FIGS. 9 and 10) serving as the source and destination of the audio packet unlike the first and second methods. The relay router 14 specifies the IP addresses of the GWs corresponding to the source and destination by using information stored in the header of the detected audio packet.

Each of the GWs 3 and 4, when receives the congestion notice, autonomously executes a priority change process (the priority change sequence) or a disconnection process (the disconnection sequence) to the audio packet flow according to setting set to the corresponding GW in advance. As shown in FIG. 9, when the priority is autonomously changed, each of the GWs 3 and 4 gives a notice (congestion message) that the priority is changed due to congestion to users (telephones 25 and 27), executes the priority change process, and notifies the CA 5 that the priority is changed.

On the other hand, as shown in FIG. 10, when the disconnection is autonomously executed, each of the GWs 3 and 4 gives a notice (congestion message) that disconnection is executed due to congestion to the users (telephones 25 and 27), executes the disconnection process, and notifies the CA 5 that the disconnection process is completed. When the CA 5 receives a completion notice of the disconnection process from the GWs 3 and 4, the CA 5 executes call control for disconnecting the telephonic communication call between the telephone 25 and the telephone 27.

In the third embodiment, it is set in each of the GWs in advance whether the priority is changed or the audio telephonic communication is disconnected. When the priority is changed, a specific priority into which the priority is changed is set in each of the GWs in advance. In addition, in the second and third embodiments, the method of notifying a congestion message applied to the first embodiment can be applied. The procedure of giving a congestion message (priority change/disconnection notice) to a user in the first to the third embodiments is not a necessary procedure.

In the third method, as in the second embodiment, the relay router need not hold the IP addresses of the VoIP-GW and the CA in advance as destination addresses for the congestion notice. In addition, the third method does not require VoIP-GW control for congestion control executed by the CA 5.

Figure 11:
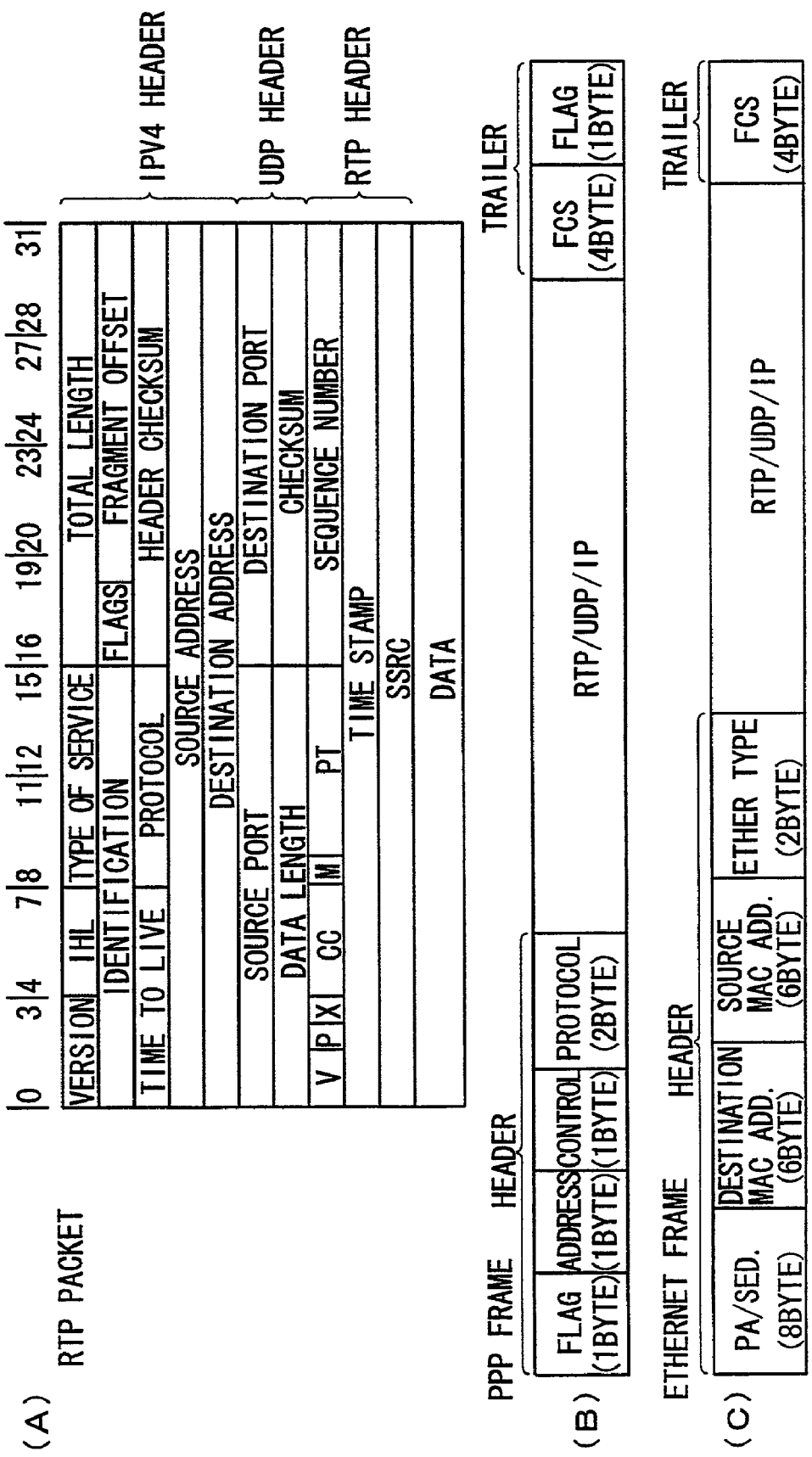
FIG. 11(A) is a diagram showing a format of an RTP packet.
FIG. 11(B) is a diagram showing a format of a PPP frame.
FIG. 11(C) is a diagram showing a format of an Ethernet frame.

FIG. 11(A) is a diagram showing a format of an RTP packet as an audio packet in the present invention. The audio packets are transferred by using an RTP (Real Time Protocol). An RTP packet, as shown in FIG. 11A, is transferred with a UDP/IP header. In addition, a PPP frame shown in FIG. 11(B) is used in a data link layer, and an Ethernet frame (Ether frame) shown in FIG. 11(C) is used in a physical layer.

Figure 12:
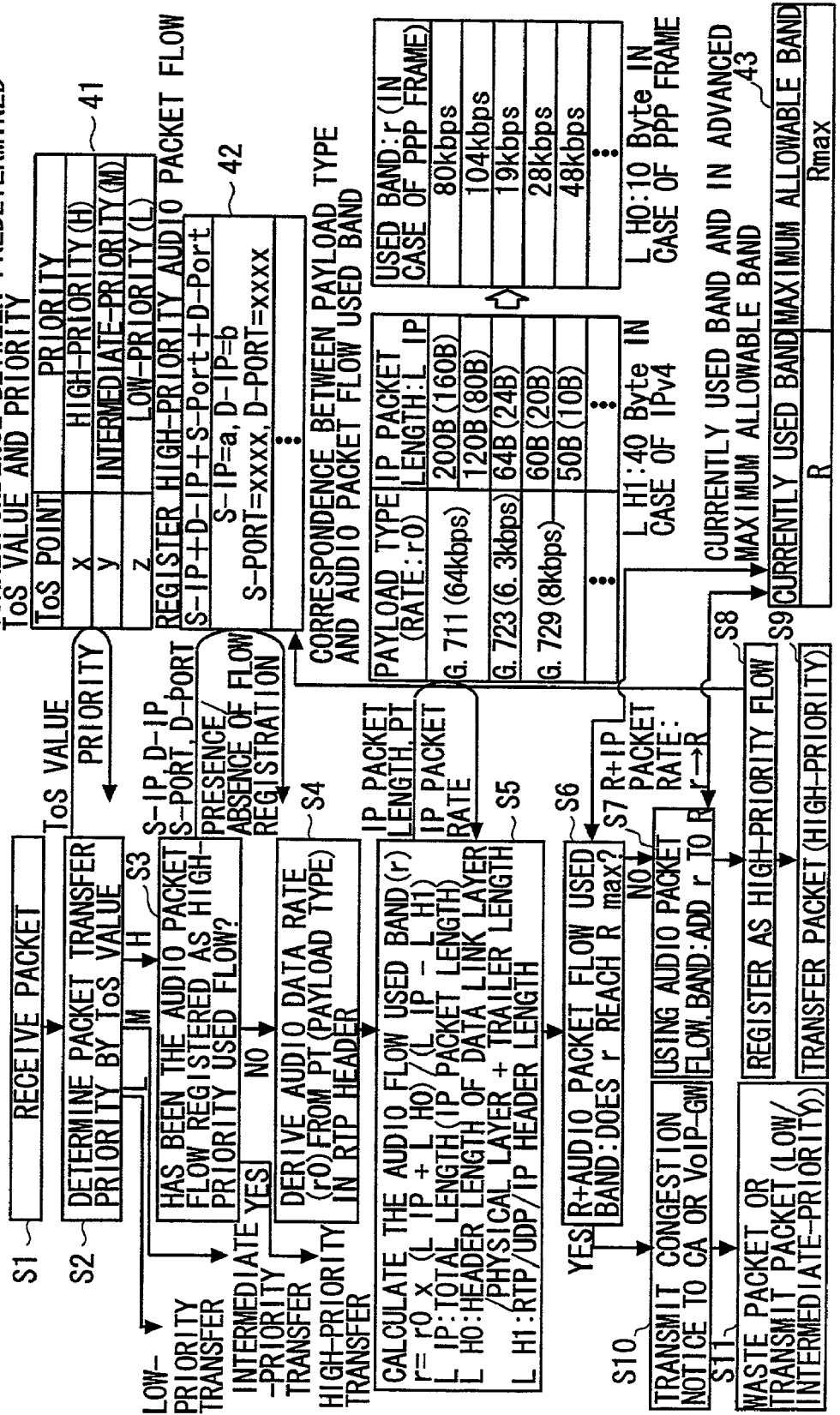
FIG. 12 is a diagram showing a congestion control method in a relay router.

FIG. 12 is a diagram showing a congestion control method in a relay router executed when the first to third embodiments are executed. The congestion control method is executed in each relay router in the VoIP network. The following process can be implemented such that a processor (CPU) mounted on the relay router executes a predetermined program.

Figure 20:
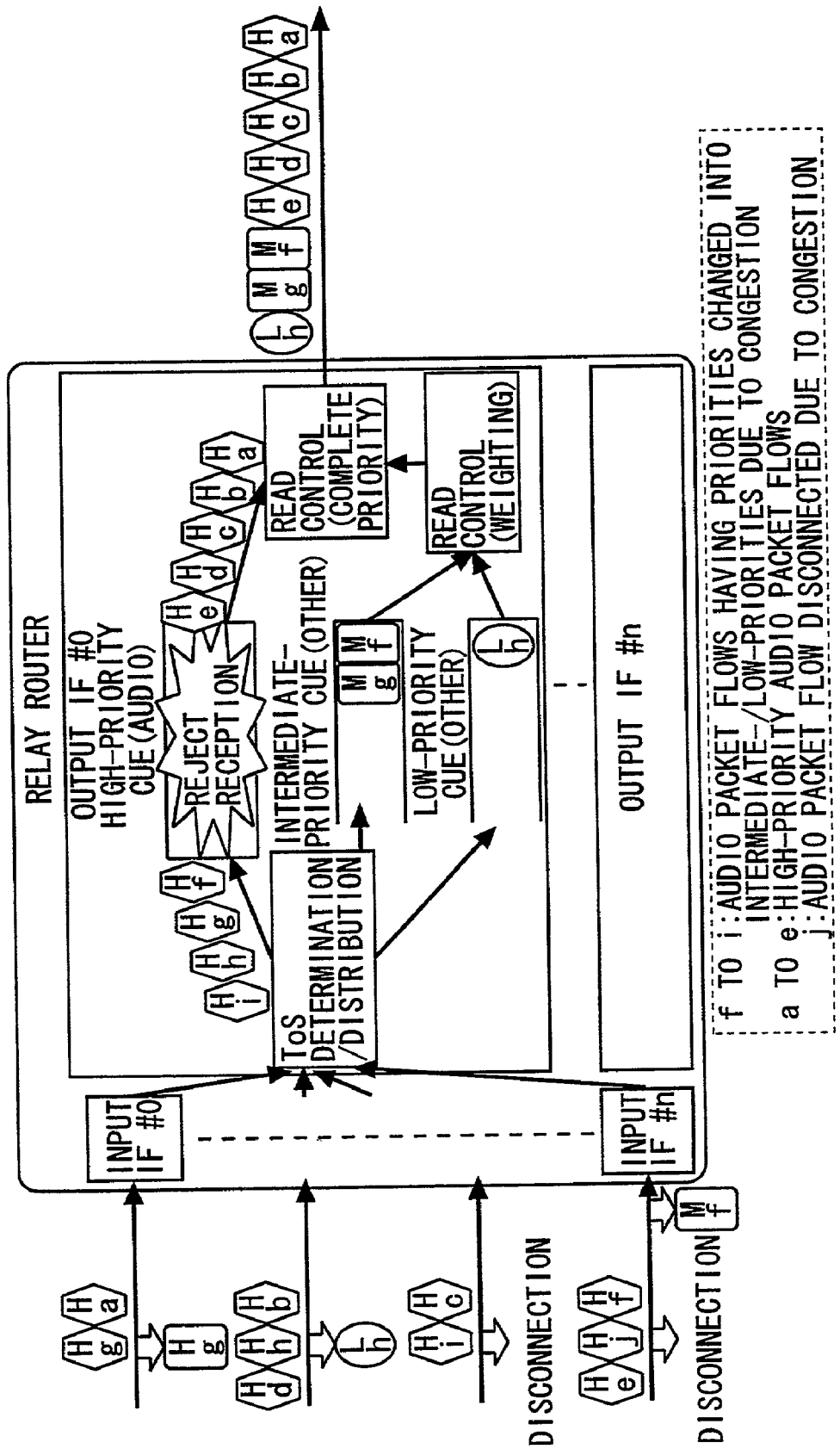
FIG. 20 is a diagram showing a VoIP transfer operation in a relay router according to the present invention.

An outline of a configuration for executing Diff-serv of a relay router will be described below by using FIG. 20. As shown in FIG. 20, each relay router has a plurality of input interfaces (input IFs) for receiving packets from a plurality of audio packet flows and a plurality of output interfaces (output IFs) for transmitting the packets received by the input IFs. Each of the output IFs includes a ToS determination/distribution unit, a plurality of cues (three cues depending on priorities, i.e., "high-priority", "intermediate-priority", and "low-priority" are illustrated in FIG. 2) prepared depending on priorities, and a read control unit. In FIG. 20, a read control unit for the high-priority and a read control unit for the intermediate-priority and the low-priority are illustrated.

The ToS determination/distribution unit determines priorities of packets (packet flows) on the basis of the values of ToS fields of the respective packet input through the plurality of input IFs, and distributes the packets to cues with the priorities. The read control unit executes read control with the priority. For example, when a packet is accumulated in the "high-priority" cue, the read control unit immediately read the packet and transfers to the packet to the next hop. In this manner, the read control unit executes read control of packets from the respective cues such that a high-priority packet is always transmit prior to intermediate- and low-priority packets (see FIG. 20).

Returning to FIG. 12, when the relay router receives an audio packet (including a frame of data link/physical layer) (S1), the relay router determines a priority of a packet transfer on the basis of a ToS value (S2). More specifically, when an audio packet received by the input IF, the ToS determination/distribution unit of the relay router extracts a ToS value (stored in the ToS field of the IP header) from the audio packet and reads a priority corresponding to the ToS value from a ToS-Priority correspondence table 41. The read priority is used as a priority to the audio packet. The ToS-Priority correspondence table 41 is prepared on a storage device mounted on the relay router in advance.

When the read priority is "intermediate-priority (M)" (S2; M) or "low-priority (L) (S2; L), the audio packets are accumulated in cues corresponding to the priorities, read from the cues at read timings corresponding to the priorities by the read control unit, and transferred to the next hop (see FIG. 20). On the other hand, when the priority is "high-priority (H)" (S2; H), the packet flow is determined as a packet flow ("high-priority use flow") that the band value of which should be calculated, and the process shifts to step S3.

In step S3, the relay router determines whether the audio packet flow in which the audio packet is transferred has been registered as a high-priority use flow. More specifically, the relay router extracts a source IP address (S-IP), a destination IP address (D-IP), a source UDP-Port number (S-Port), and a destination UDP-Port number (D-Port) from the audio packet. The information functions as flow specifying information for specifying a packet flow.

Subsequently, the relay router determines whether the acquired flow specifying information is stored in a registration table 42 for the flow specifying information, which is generated on a storage device in the relay router or not.

The registration table 42 is a table (storage area) in which the flow specifying information of a "high-priority" packet flow (in this example, an audio packet flow) generated in the VoIP network at the present and passing through the relay router is stored. The registration table 42 can be constituted by using, e.g., a CAM (Content Addressable Memory). In this manner, the flow specifying information can be referred to at a high speed. The registration table 42 corresponds to a flow specifying information storage means of the present invention.

The flow specifying information acquired from the audio packet has been stored in the registration table 42 (S3; YES), the audio packet is accumulated in the cue corresponding to the "high-priority (H)", read from the cue at the read timing with the priority, and transferred to the next hop (see FIG. 20).

When the flow specifying information acquired from the audio packet is not stored in the registration table 42 (S3; NO), the relay router recognizes that a new audio packet flow of the audio packet is generated, and calculates a used band of the audio packet flow.

More specifically, the relay router derives an audio data rate (r0) from a PT (Payload Type) field in the RTP header of the audio packet in step S4 (band of audio data is discriminated) For example, when the value of the payload type is "0" (PT=0), the codec type of the PCM audio data is G. 711, and an audio data band is 64 kbit/s.

The relay router calculates a used band r [bit/s] of the audio packet flow by using the following equation (S5).

$$\text{Used band } r = r0 * (LIP + LH0)/(LIP - LH1) \qquad \text{<Equation>}$$

In this equation, "L IP [Byte]" is a value of sum total length (IP packet length) in the IP header of the audio packet, "L H0 [Byte]" is a sum of header lengths+trailer lengths of a data link layer and a physical layer frame, and "L H1 [Byte]" is a sum of RTP/UDP/IP header lengths.

The "(L IP+L H0)" indicates a frame length including the header and trailer of the data link layer/physical layer. The "(L IP−L H1)" indicates an audio data length obtained by subtracting the RTP/UDP/IP header length from the audio packet (IP packet).

For example, when the audio packet is given by:
PT=0 (64 kbit/s);
L IP=200 Byte
L H0=10 (when data link layer is PPP frame); and
L H1=40 (when IP is IPv4),
r=64*(200+10)/(200−40)=84 [kbit/s]

is satisfied.

When a used band r of a new audio packet flow is calculated, the relay router reads out a value "R" of a currently used band and a value "R max" of the maximum allowable band from a band value holding table 43, and determines whether a sum (R+r) of the used band "r" and the currently used band "R" exceeds the maximum allowable band "R max".

The band value holding table 43 is formed on the storage device mounted on the relay router, and stores the value of the currently used band "R" serving as a sum total of used bands of the "high-priority" audio packet flow which has been generated and the maximum allowable band "R max" serving as the maximum allowable value of a "high-priority" used band. The value of "R max" is determined such that the "high-priority (H)" audio packet is transferred to have the same quality as that of audio telephonic communication by STM. The band value holding table 43 corresponds to a sum total storage means and an allowable value storage means according to the present invention.

When the relay router determines that the sum total (R+r) of bands does not exceed the maximum allowable band R max (S6; NO), the relay router stores the sum total (R+r) of bands in the band value holding table 43 as a new currently used band R (the value of the currently used band R is updated) (S7).

Next, the relay router registers the flow specifying information of the audio packet flow in the registration table 42 (S8). Thereafter, the audio packet of the audio packet flow is distributed to the cue of "high-priority (H)", reads the audio packet at a read timing depending on the "high-priority (H)", and transfers the audio packet to the next hop.

On the other hand, when the relay router determines in step S6 that the sum total (R+r) of bands exceeds the maximum allowable band R max (S6; NO), the relay router transmits a congestion notice to a predetermined destination (S10).

Thereafter, the relay router changes the priority of the audio packet of the audio packet flow or wastes (or discards) the audio packet (S11). For example, when the priority change sequence is executed, the relay router changes the value of the ToS field of the audio packet such that the audio packet is distributed to "intermediate-priority (M)" or "low-priority (L)", and the audio packet is inserted into the corresponding cue. On the other hand, for example, the disconnection sequence is executed, the relay router wastes the audio packet. The disconnection sequence may be executed together with the priority change executed by the relay router, and the priority change sequence may be executed together with waste of the packet executed by the relay router.

The process in step S11 is executed to the audio packet of the audio packet flow which is received by the relay router until the setting for the audio packet flow is changed by executing the priority change or the disconnection sequence.

When the first method is applied, the relay router acquires the address of the CA 5, which is set in the relay router in advance, and transmits the congestion notice to the CA 5. In contrast to this, when the second method is applied, the relay router extracts the source IP address (IP address of the source GW of the audio packet) of the audio packet, and transmits the congestion notice having the extracted IP address as the destination. In contrast to this, when the third method is applied, the relay router extracts the source/destination IP addresses (IP address of the source and destination GWs of the audio packet) of the audio packet, and transmits a congestion notice having the extracted source IP address as the destination and the congestion notice having the extracted destination IP address as the destination.

In this manner, the priority change sequence and the disconnection sequence according to the applied method (one of the first to third methods) are executed.

Thereafter, when the disconnection sequence is executed, the relay router does not receive the audio packet of the audio packet flow. On the other hand, when the priority change sequence is executed, the relay router receives the audio packet having the "intermediate-priority (M)" or "low-priority (L)" instead of the audio packet having the "high-priority (H)" from the audio packet flow. Therefore, the audio packet is transferred with the priority on the basis of the determination in step S2.

As described above, the relay router functions as a device having a monitor means according to the present invention by executing the processes in steps S1 to S9. The relay router executes at least the process in step S10.

When the relay router executes the processes in steps S1 to S11, the relay router can autonomously know the used band of the audio packet flow without executing band preservation control such as RSVP. Since the relay router can monitor a sum total of bands of all "high-priority" audio packet flows, for example, complex band monitor control such as a method using a Leaky Bucket algorithm which is a method of monitoring used bands of respective flows need not be executed. In this manner, a load on the relay router in congestion control (QoS control) is reduced.

When the used band of a high-priority audio packet flow exceeds a predetermined value (R max) due to generation of a "high-priority" audio packet flow, a change in the priority of the audio packet flow or disconnection of the audio packet flow are executed by one of the first to third methods.

In this manner, it is prevented that the audio packet having the "high-priority" remain in the "high-priority" cue (the audio packets are delayed) and/or the audio packets having the "high-priority" lost by overflow from the "high-priority" cue. For this reason, the high-priority audio packet flow(s) that has been generated before causing the congestion can escape from the influence of the congestion.

Therefore, the state in which the high-priority audio packet flow that has been registered is preferably transferred to the next hop can be maintained, and the quality (QoS) of a telephonic communication call, which is established before a new audio packet flow is generated can be preferably maintained.

Figure 13:
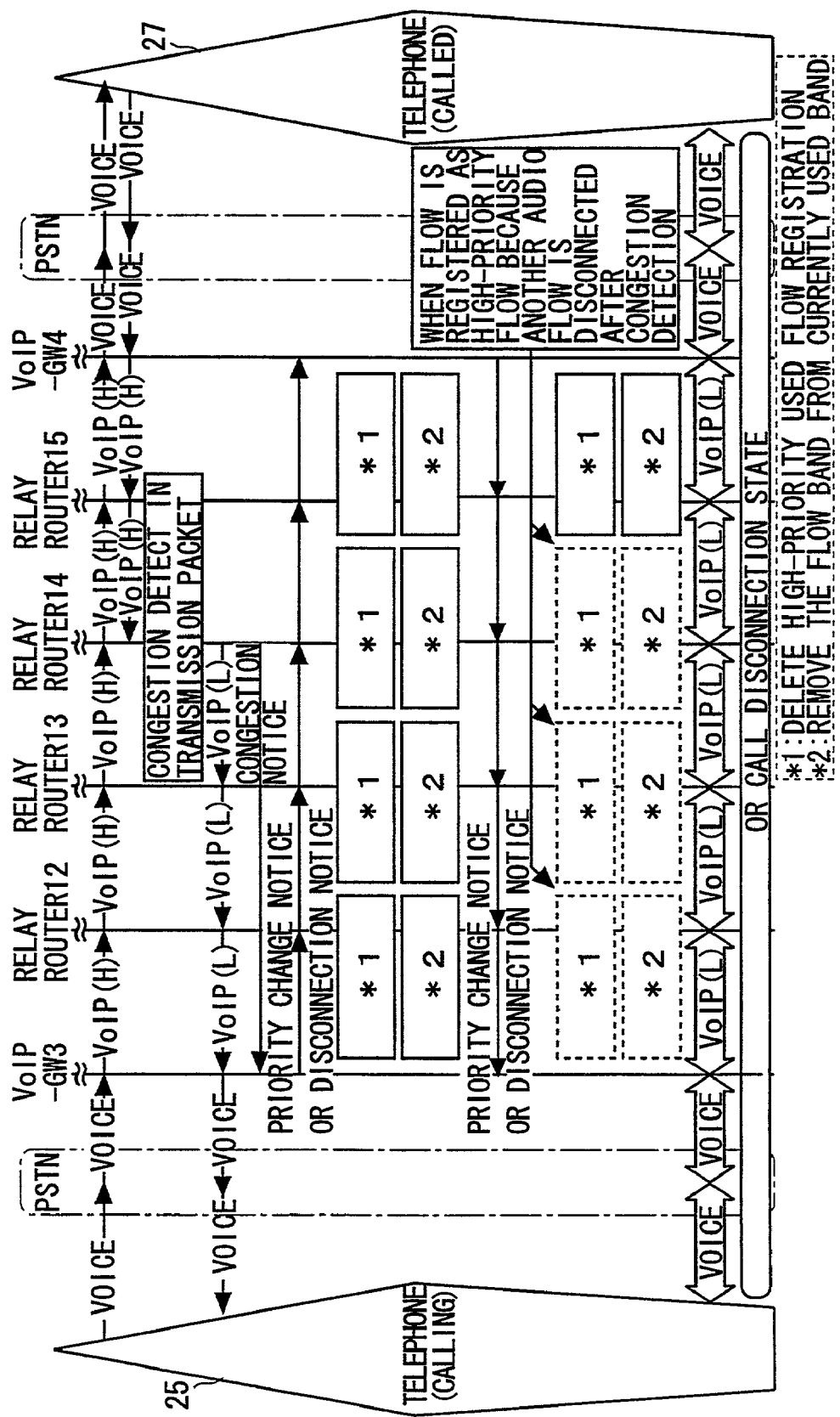
FIG. 13 is a diagram showing a method, which cancels registration of a high-priority packet flow in each relay router when a packet transfer priority is changed or disconnection is executed.

FIG. 13 is a diagram showing a method, which deletes registration of the high-priority audio packet flow in each relay router when packet transfer is changed in priority or is disconnected. In the example in FIG. 13, a telephonic communication call is established between the telephone 25 and the telephone 27 is established, and the relay router 14 registers an audio packet flow from the GW 3 to the GW 4 is registered as a "high-priority" audio packet flow. However, FIG. 13 shows an example in which congestion of the audio packet flow from the GW 4 to the GW 3 is detected.

By one of the first to third methods, each of the GWs 3 and 4 which executes the change of the priority or the disconnection of the audio packet flow transmits a packet (notice packet) for notifying that the completion of the change in priority of packet transfer or disconnection to the opposite GW (the GW 4 for the GW 3 and the GW 3 for the GW 4).

When the relay router 14 detects the notice packet from the GW 3 to the GW 4, the relay router 14 deletes the high-priority audio packet flow corresponding to the notice packet from the high-priority audio packet registration (registration table 42), and removes the band used in the high-priority audio packet flow from the value of the currently used band "R" held in the band value holding table 43 (subtracts the band from the currently used band "R").

The audio packet flow from the GW 4 to the GW 3 is not registered as a "high-priority" audio packet flow when the relay router 14 detects congestion, and the priority of the audio packet flow is change the "high-priority (H)" into a priority (e.g., "low-priority (L)") lower than the "high-priority (H)" (when the priority change sequence is executed). In this case, the relay routers 14, 13, and 12 do not register the audio packet flow as a "high-priority" audio packet flow.

However, when another audio packet flow is disconnected until the GW 4 changes the priority in the priority change sequence (congestion control) executed later, and when the band is made idle in the relay router 14, the audio packet flow may be registered as a "high-priority" audio packet flow.

Therefore, when each of the relay routers 14, 13, and 12 receives the notice packet from the GW 4 to the GW 3, and if the audio packet flow corresponding to the notice packet is registered in the registration table 42 as a "high-priority" audio packet flow, the registration of the audio packet flow is deleted. Further, the band of the audio packet flow is subtracted from the currently used band "R".

In this manner, each relay routers 12, 13 and 14 can release bands for the high-priority relating to both the audio packet flow from the GW 3 to the GW 4 and the audio packet flow from the GW 4 to the GW 3 when the congestion caused by any one of the audio packet flows corresponding to one telephonic communication.

Figure 14:
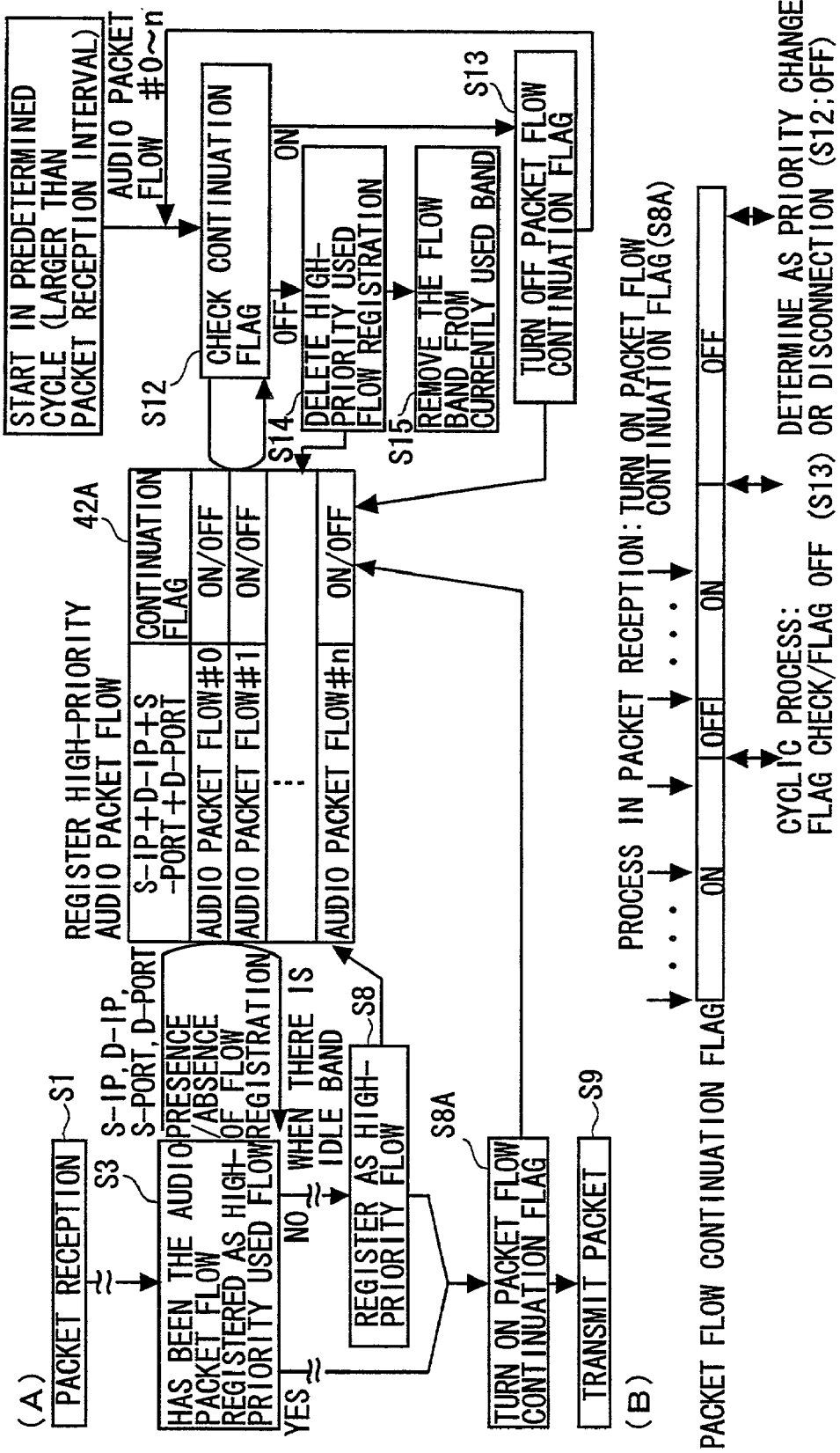
FIGS. 14(A) and (B) are diagrams showing a method in which a relay router autonomously determines priority change and disconnection.

FIGS. 14(A) and 14(B) are diagrams showing a method in which a relay router autonomously determines priority change and disconnection. This method will be described below as a modification the method (method in which a relay router deletes registration and changes a currently used band according to a notice packet) shown in FIG. 13.

As shown in FIG. 14(A), the relay router has a registration table 42A in place of the registration table 42 as a place in which at least one "high-priority" audio packet flow is registered. The registration table 42A holds a flag representing that an audio packet related to the audio packet flow is continuously received by the relay router together with the flow specifying information of the "high-priority" audio packet flow per audio packet flow. The registration table 42A corresponds to flow specifying information storage means according to the present invention.

When the received packet has been registered as a high-priority audio packet flow (S3; YES in FIG. 14(A)) and is registered as a high-priority audio packet flow because there is an idle band (S8 in FIG. 14(A)), the relay router turns on a continuation flag corresponding to the "high-priority" audio packet flow (S8A).

On the other hand, the relay router executes the following processes (steps S12 to S15) in a predetermined cycle.

More specifically, the relay router periodically checks each continuation flag in the registration table 42A (S12). When the flag is in an "ON" state (S12; ON), the relay router turns the flag "OFF".

The relay router executes the processes (loop process in steps S12 and S13) to all the high-priority audio packet flows registered on the registration table 42A. The loop process is executed for each high-priority audio packet flow in a cycle (e.g., 1 second) having an interval larger than a packet receiving interval (e.g., 20 millisecond).

In step S12, when the state of the continuation flag to be checked is an "OFF" state (S12; OFF), the relay router deletes the high-priority audio packet flow from the high-priority audio packet registration (registration table 42A) (S14), and subtracts the value of the used band of the high-priority audio packet flow from the value of the currently used band R of the band value holding table 43 (S15). FIG. 14(B) is a diagram showing a state of a continuation flag to a certain audio packet flow.

In this manner, even if the relay router does not receive the notice (notice packet) representing completion (finish) of the priority change of the disconnection from the GW, the relay router, when detects the audio packet flow of the continuation flag having the "OFF" state, can know that the priority change sequence or the disconnection sequence is executed to the audio packet flow. The relay router can autonomously the execute deletion of registration of the audio packet flow and the change of the currently used band "R" on the basis of the determination.

Figure 15:
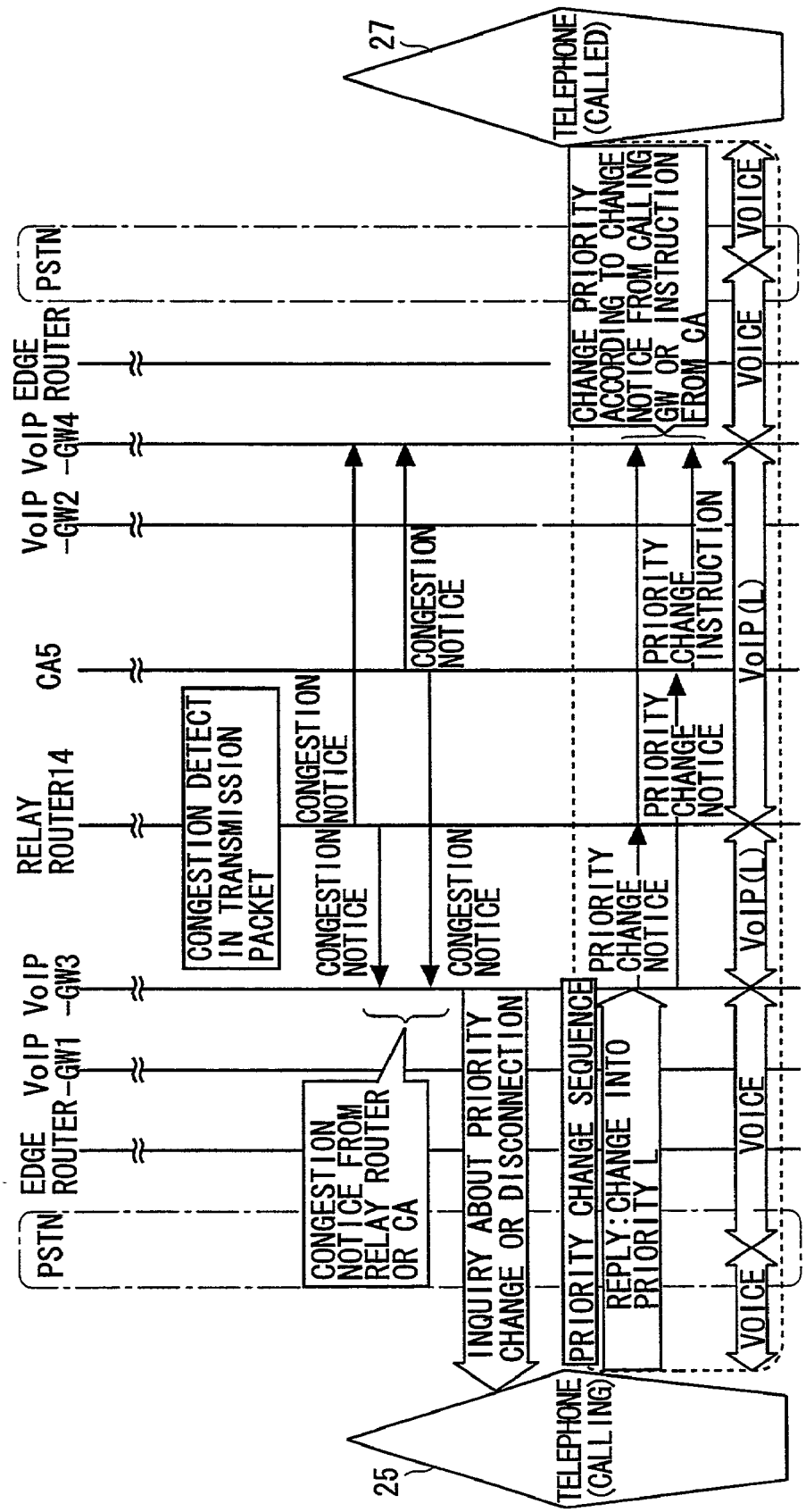
FIG. 15 is a diagram showing a sequence, which executes priority change or disconnection according to selection of a calling subscriber.
Figure 16:
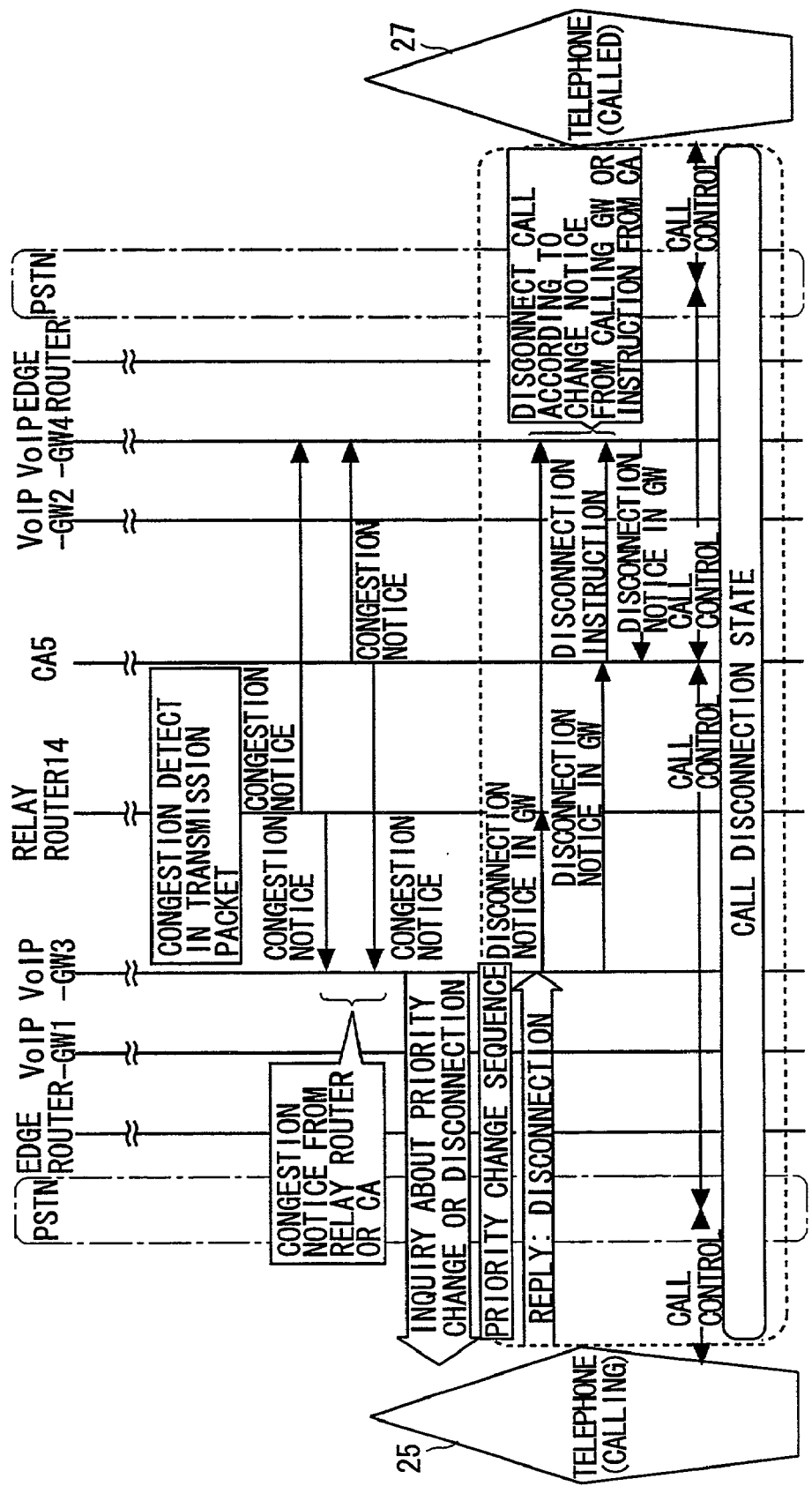
FIG. 16 is a diagram showing a sequence, which execute priority change or disconnection according to selection of a calling subscriber.

FIG. 15 is a diagram showing a priority change sequence according to selection of a calling (calling side) subscriber. FIG. 16 is a diagram showing a disconnection sequence according to selection of a calling (calling side) subscriber. The method shown in FIGS. 15 and 16 corresponds to a fourth method in which the calling subscriber executes priority control.

In FIGS. 15 and 16, since the processes executed until the relay router 14 detects the congestion are the same as those in FIGS. 2 and 3, a description thereof will be omitted. In FIGS. 15 and 16, a calling GW (GW 3 in the illustrated example) receives the congestion notice directly from the relay router 14 or receives the congestion notice through the CA when the used band of a "high-priority" audio packet flow exceeds "R max" (congestion is detected in the relay router (e.g., the relay router 14). This congestion notice includes the flow specifying information of the audio packet flow subjected to the priority change or the disconnection.

When the calling GW (GW 3) receives the congestion notice, the calling GW notifies a calling subscriber (user of the telephone 25 in the illustrated example) that the congestion is being generated (congestion message) before the priority change or the disconnection is executed, and inquires that the calling subscriber selects either the priority change or the disconnection.

When the calling subscriber receives the congestion message, the calling subscriber selects one of the priority change and the disconnection of telephonic communication. In addition, when the calling subscriber selects the priority change, the calling subscriber can select a changed priority. A reply obtained by the selection of the calling subscriber is given to the calling GW (GW 3).

The calling GW (GW 3) executes the priority change sequence (FIG. 15) or the disconnection sequence (FIG. 16) according to the reply (selection result) from the calling subscriber. FIG. 15 shows two methods in the priority change sequence. In the first method, the GW 3 gives a priority change notice to a called GW (GW4) through the relay routers on the audio packet flow. In the second method, the GW 3 gives a priority change notice to the CA 5, and the CA 5 gives a priority change instruction based on the priority change notice to the called GW (GW 4). The priority change notice/instruction includes the changed priority (e.g., "low-priority (L)") selected by the subscriber. The calling and called GWs change the ToS value of the audio packets of the audio packet flows corresponding to targets of the priority change sequence into alternative value corresponding to a priority lower than the high-priority.

FIG. 16 shows two methods in the disconnection sequence. In the first method, the GW 3 gives a disconnection notice to the called GW (GW 4) through the relay routers on the audio packet flow. In the second method, the GW 3 gives the disconnection notice to the CA 5, and the CA 5 gives a disconnection instruction based on the disconnection notice to the called GW (GW 4). The calling and called GWs execute the disconnection process of the audio packet flow corresponding to targets of the disconnection process (sequence). Upon completion of the disconnection process, the calling and called GWs give the CA 5 the completion of disconnection process. The CA 5 executes the call control for disconnecting the telephonic communication call between the telephone 25 and the telephone 27 corresponding to the disconnected audio packet flows.

According to the fourth method, when the congestion relating to the telephonic communication cause, a calling subscriber can select whether he or she continues the telephonic communication by lower priority or stops the telephonic communication. The GW 3 shown in FIGS. 15 and 16 functions as a VoIP gateway device including a setting means, an inquiring means, and a control means according to the present invention.

Figure 17:
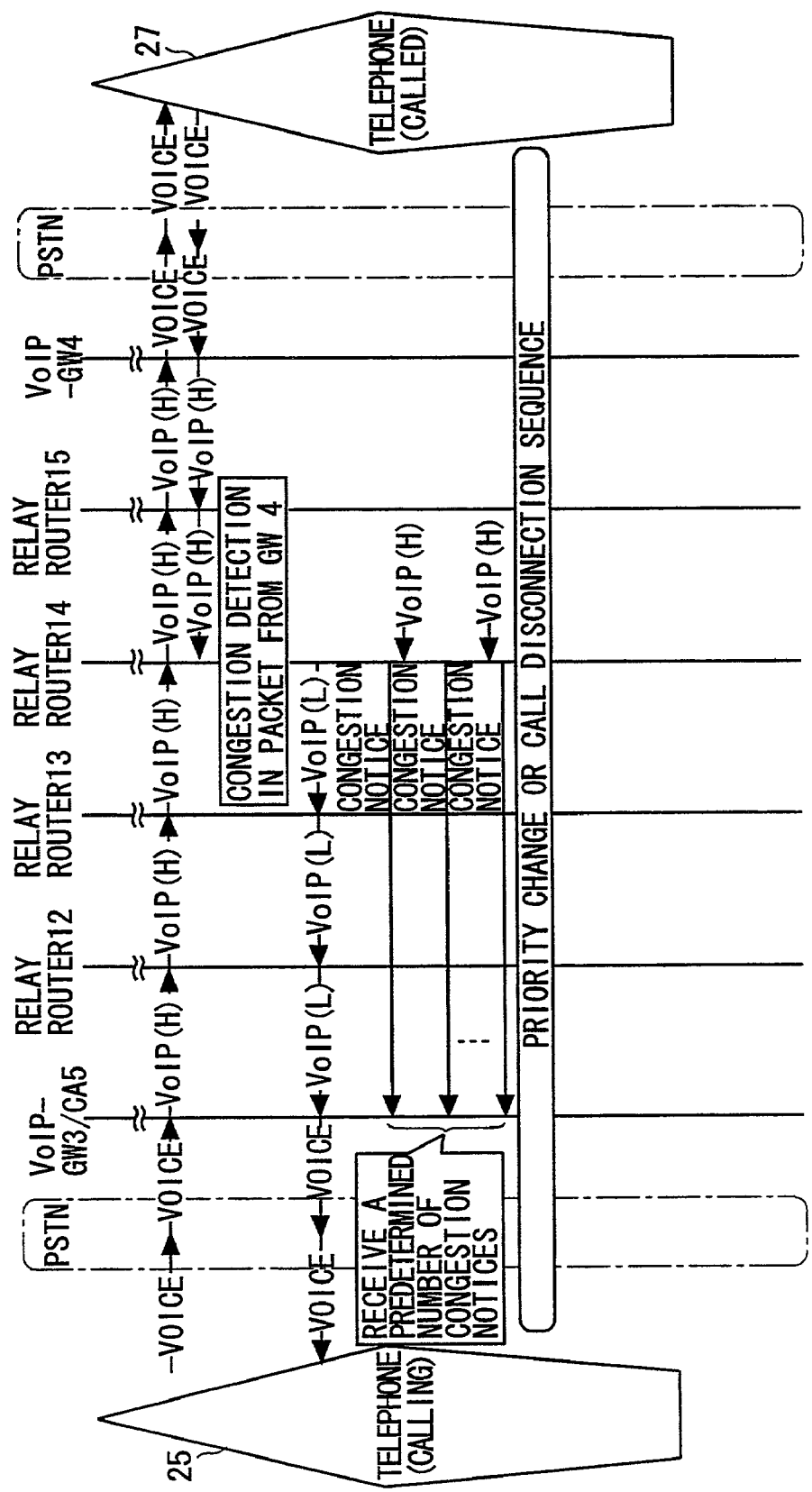
FIG. 17 is a diagram showing a congestion determination method executed by congestion notice reception counts in a CA and a VoIP-GW.
Figure 18:
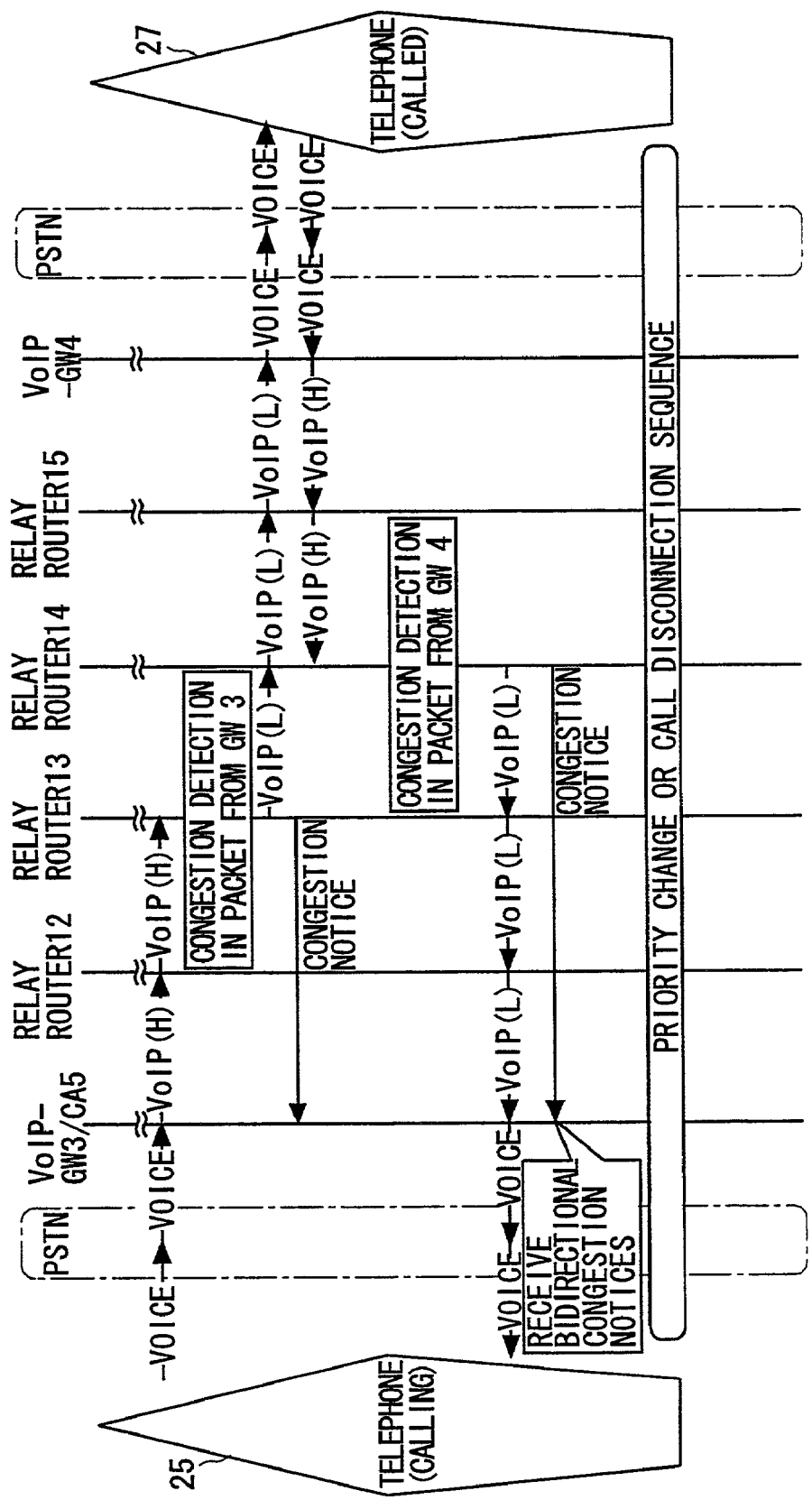
FIG. 18 is a diagram showing a congestion determination method executed by bi-directional congestion notice reception in the CA and the VoIP-GW.

FIGS. 17 and 18 are diagrams showing a congestion determination method in a CA or a VoIP-GW. FIG. 17 shows a first congestion determination method by the CA or the VoIP-GW. FIG. 18 shows a second congestion determination method by the CA or the VoIP-GW.

In the first congestion determination method, the CA 5, which control the VoIP-GWs or the VoIP-GW executes the priority change process or the disconnection process under a condition that the CA 5 or the VoIP-GW receives the congestion notice from the relay router predetermined number of times (one or more times).

In the example shown in FIG. 17, with respect to a telephonic communication call between the telephone 25 and the telephone 27, the relay router 14 detects congestion related to the audio packet flow from the GW 4 to the GW 3, and transmits a congestion notice of the detected congestion each time the audio packet is received. In the example shown in FIG. 17, the relay router 14 changes the priority of the audio packet flow with the detection of the congestion.

The congestion notice transmitted from the relay router 14 is transmitted to a predetermined destination, i.e., the CA 5 or the GW 3. When the number of times of reception of the congestion notice to a certain audio packet flow is a predetermined number of times or more, the CA 5 or the GW 3 executes the priority change or disconnection sequence under the control of the GW 3. In this case, when a subject which controls the GW is the CA 5, the priority change or disconnection sequence of the first method is executed. On the other hand, when a subject which controls the GW is the GW, the priority change or disconnection sequence of the second or third method is executed.

In this manner, it is may be that the priority change or disconnection sequence is executed when the subject (CA or GW itself) receives, predetermined number of times, the congestion notices of a certain audio packet flow of the high-priority. Then, the reception of predetermined number of times of the congestion notices becomes a trigger (opportunity) to execute the priority change or disconnection sequence.

In this manner, when numbers of times of reception of congestion notices by the CA and the VoIP-GW (control subjects) are set to be 2 or more, the sensitivities of congestion determination in the control subjects can be adjusted. More specifically, determination by the first packet of a new audio packet flow is not executed, a high-priority band in the relay router can be tried to be reserved for a predetermined period of time.

In the second congestion determination method, the CA which controls the VoIP-GW or the VoIP-GW which controls itself control the VoIP-GW to execute the priority change or the disconnection under a condition that both a congestion notice representing that an audio packet flow from the calling side to the called side cannot be transferred with a high priority due to the congestion and a congestion notice that an audio packet flow from the called side to the calling side cannot be transferred with a high priority due to the congestion are received.

In the example shown in FIG. 18, with respect to the telephonic communication call between the telephone 25 and the telephone 27, the relay router 14 gives the CA 5 and the GW 3 corresponding to the destination (control subject of the GW) the congestion notice based on the audio packet from the GW 3 (calling GW), and gives the CA 5 or the GW 3 the congestion notice based on the audio packet from the GW 4 (called GW).

When the CA 5 or the GW 3 receives the congestion notice based on both the audio packets on the calling side and the called side, as in the example in FIG. 17, the CA 5 or the GW 3 executes one of the priority change sequence and the disconnection sequence according to a predetermined setting.

According to the second congestion determination method, when one of newly generated audio packet flows (for example, an audio packet flow from the calling side to the called side) can reserve a high-priority band in the relay router, and when the other audio packet flow (for example, an audio packet flow from the called side to the calling side) cannot reserve a high-priority band, until congestion related to the other audio packet flow (the audio packet flow from the called side to the calling side) is detected, the relay router can keep trying acquisition of a high-priority band to the audio packet flow. For example, when the other audio packet flow relating to the other telephonic communication is disconnected, the high-priority band of the other audio packet flow can be reserved. Therefore, a change in priority or disconnection need not be executed.

Figure 19:
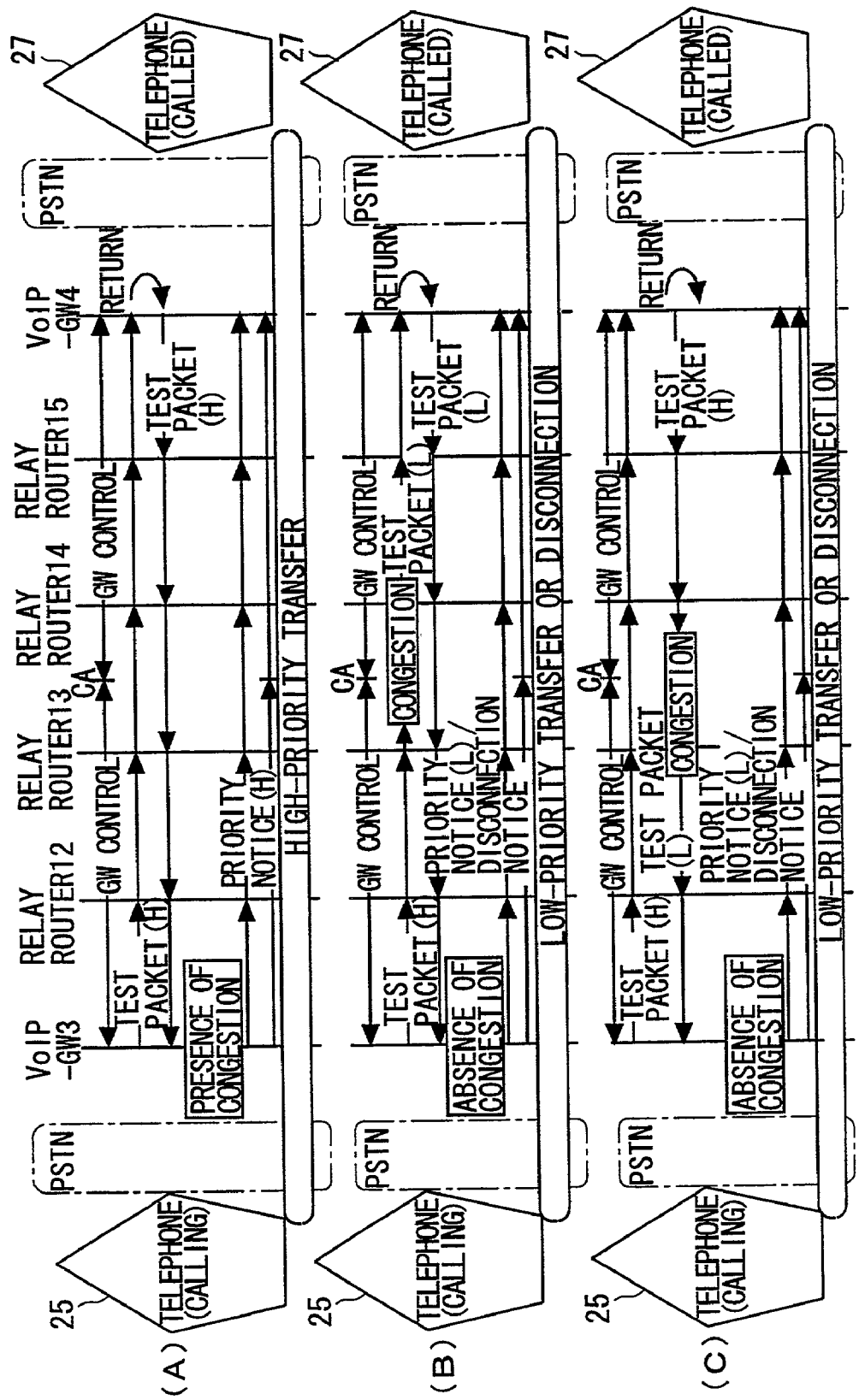
FIG. 19 is a diagram showing a method, which executes congestion determination by using a test packet before call connection.

FIGS. 19(A), 19(B), and 19(C) show a method of determining congestion by using a test packet immediately before call connection. A calling VoIP-GW (GW3 in the example in FIGS. 19(A), (B) and (C)) generates a test packet having a source IP address, a destination IP address, a source UDP-port number, and a destination UDP-port number of an audio packet flow corresponding to a setting target. Further, the calling VoIP-GW sets the "high-priority (H)" to the test packet. Moreover, the calling VoIP-GW transmits the test packet to a called VoIP-GW (GW 4 in the example in FIGS. 19(A), (B) and (C)).

Each of the relay routers (relay routers 12, 13, 14, and 15 in the example in FIGS. 19(A), (B) and (C)) which relay the audio packets by audio packet flows of the setting target receives the test packet, and tries registration the packet flow of the test packet to the "high-priority". Then, if each of the relay routers detects the congestion of the "high-priority" by the packet flow of the test packet, the relay router detected the congestion changes the priority of the test packet into the lower priority (e.g., "lower-priority (L)", see FIG. 19(B)).

When the called VoIP-GW receives the test packet, the VoIP-GW returns the test packet to the calling VoIP-GW. The test packet turns back to the calling VoIP-GW. In this manner, the test packet serves as a test packet of an audio packet flow in a backward direction (called side→calling side).

When each of the relay routers (the routers 12, 13, 14, and 15 in FIGS. 19(A), (B) and (C)) which relay audio packets through backward audio packet flows receives the test packet and checks whether the ToS value in the test packet corresponds to the "high-priority" or not. Then, if the ToS value does not correspond to the "high-priority", the relay router transfers the test packet to the next hop. On the other hand, if the ToS value corresponds to the "high-priority", the relay router determine whether the test packet flow is able to register to the "high-priority" packet flow or not (whether the congestion of the "high-priority" is caused by registration of the test packet flow or not). If the test packet flow is able to register to the "high-priority", the relay router transfers the test packet to the next hop without changing the priority of the test packet. On the other hand, if the test packet flow is not able to register (congestion caused), the relay router changes the ToS value of the test packet into a value corresponding to a priority lower than the "high-priority" (e.g., "lower-priority (L)", and transfers the test packet to the next hop (see FIG. 19(C)).

The calling VoIP-GW receives the returned test packet. When the priority (ToS value) of the returned test packet is "high-priority (H)", the calling VoIP-GW sets the "high-priority (H)" to the audio packet flow of the setting target. In contrast to this, when the priority (ToS value) of the returned test packet is a lower priority ("low-priority (L)"), the calling VoIP-GW sets a predetermined lower priority (e.g., "lower-priority (L)") to the audio packet flow of the setting target (the priority is changed), or stops (or disconnects) the audio packet flow of the setting target and notifies the called VoIP-GW that setting the audio packet flow is stopped.

At this time, as a method of deciding change of a packet transfer priority or disconnection in the calling VoIP-GW, any one of a method which sets the determination in advance and a method according to selection by the calling subscriber shown in FIG. 16 can be applied.

The called VoIP-GW, when receives the notice from the calling VoIP-GW, changes the priority of the audio packet flow of the setting target into a predetermined lower priority or stops (disconnects) setting the audio packet flow of the setting target according to notice contents from the calling VoIP-GW.

In this manner, before a new telephonic communication call is connected, the priority of the audio packet flow related to the telephonic communication call can be established. In addition, when a desired priority cannot be obtained, the audio packet flow can also be disconnected. The calling GW 3 shown in FIGS. 19(A), (B) and (C) functions as a VoIP gateway device including transmission means, reception means, and control means according to the present invention.

In the above operation, when each of the relay routers executes the same operation for the first packet of a new high-priority audio packet flow to a test packet, a special operation for the test packet is not required.

As has been described above, according to the present invention, by using a method, which is simpler than a conventional method, bands of a high-priority packet flow are autonomously and dispersively managed and reserved by each of the relay routers. The priority of an audio packet flow having a band, which exceeds a predetermined band is changed into a lower priority, or the audio packet flow is disconnected. In this manner, overflow of a cue for high-priority audio packet flows in the relay routers is prevented (see FIG. 20).

FIG. 20 illustrates the following example. That is, when high-priority audio packet flows Ha to He have been established, high-priority audio packet flows Hf to Hj are generated, respectively. When congestion is generated when the audio packet flows Hf to Hj are transferred with high priority, the priorities of the audio packet flows Hf to Hi are changed from the high priorities to intermediate or low priorities, and the audio packet flow Hj is disconnected.

Therefore, delay or packet loss does not occur in audio packet flows (Ha to He in FIG. 20) of a telephonic communication call, which has been established. Therefore, with respect to the telephonic communication call of these audio packet flows, an audio quality deterioration factor in an IP network (VoIP network) is excluded.

More specifically, when audio telephonic communication, which has been connected is kept in a high-quality state, even though a relay router is congested by audio telephonic communication which is connected later, the telephonic communication which generates the congestion does not influence the high-quality state of the connected audio telephonic communication because of priority change or disconnection. The same concept as that of a congestion control method in such an STM exchange network can be employed in VoIP transfer.

Figure 21:
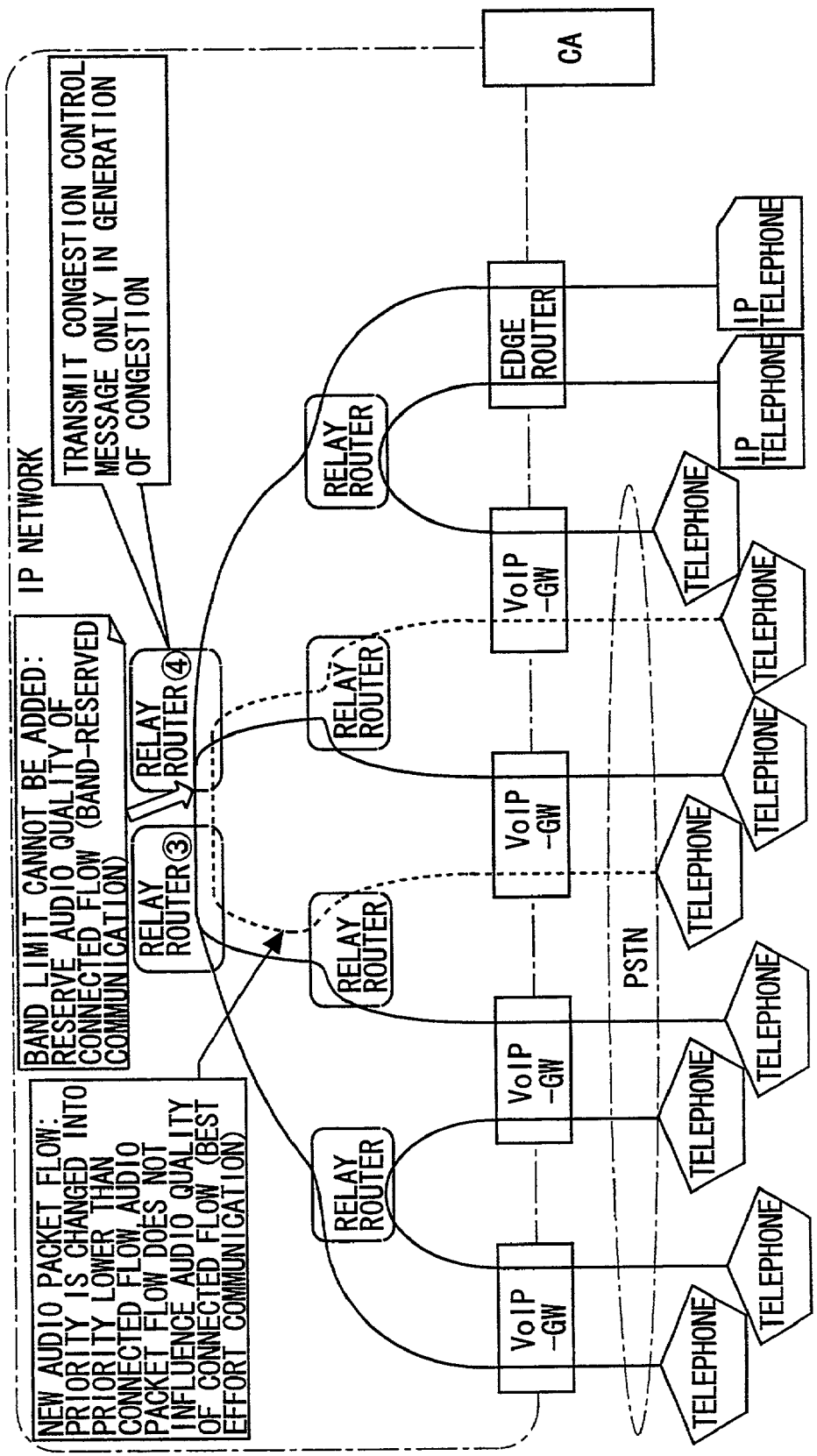
FIG. 21 is a diagram showing congestion generation in a VoIP network according to the present invention.
Figure 22:
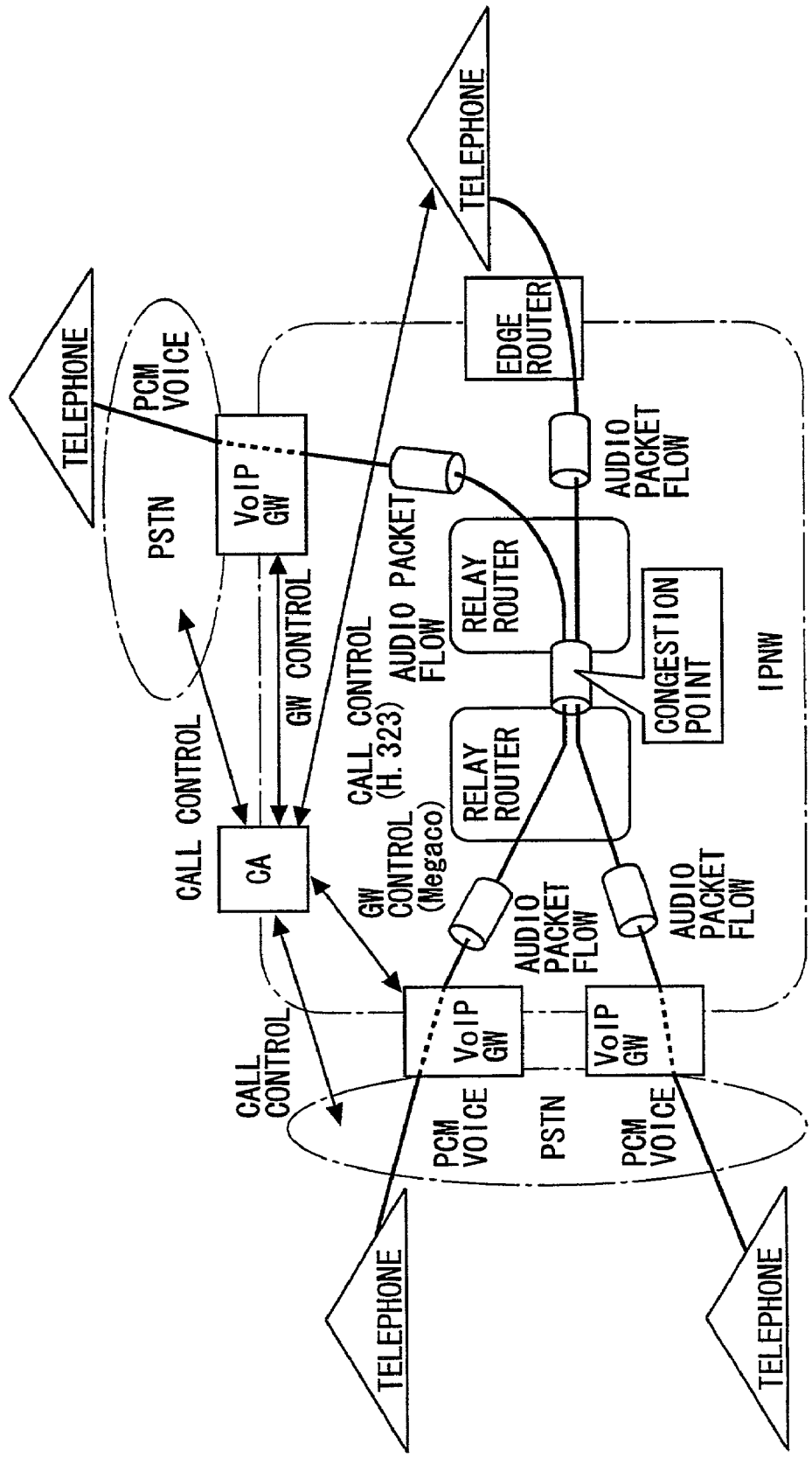
FIG. 22 is a diagram showing a VoIP network configuration.
Figure 23:
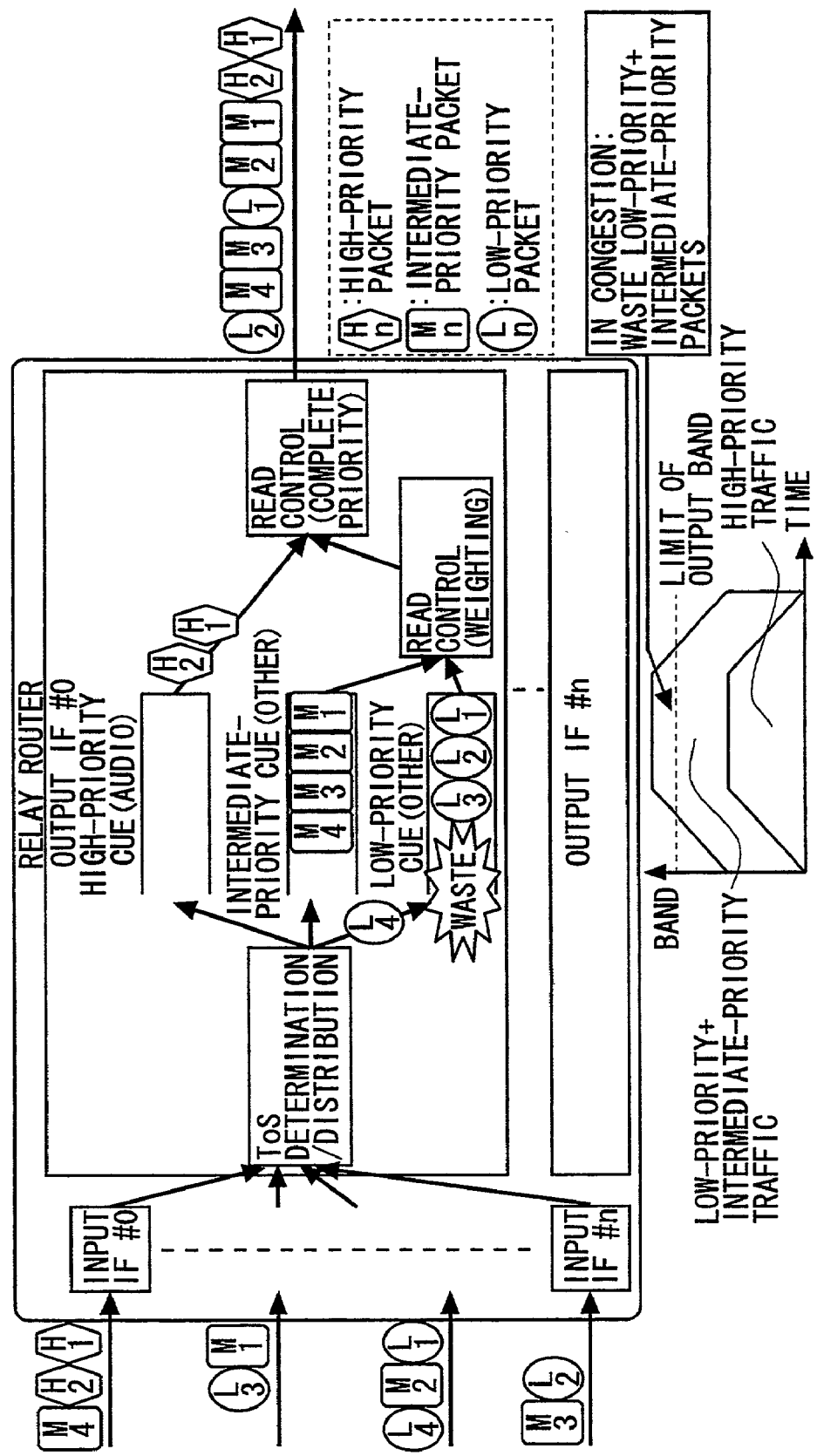
FIG. 23 is a diagram showing VoIP priority control executed by a conventional Diff-serv.
Figure 24:
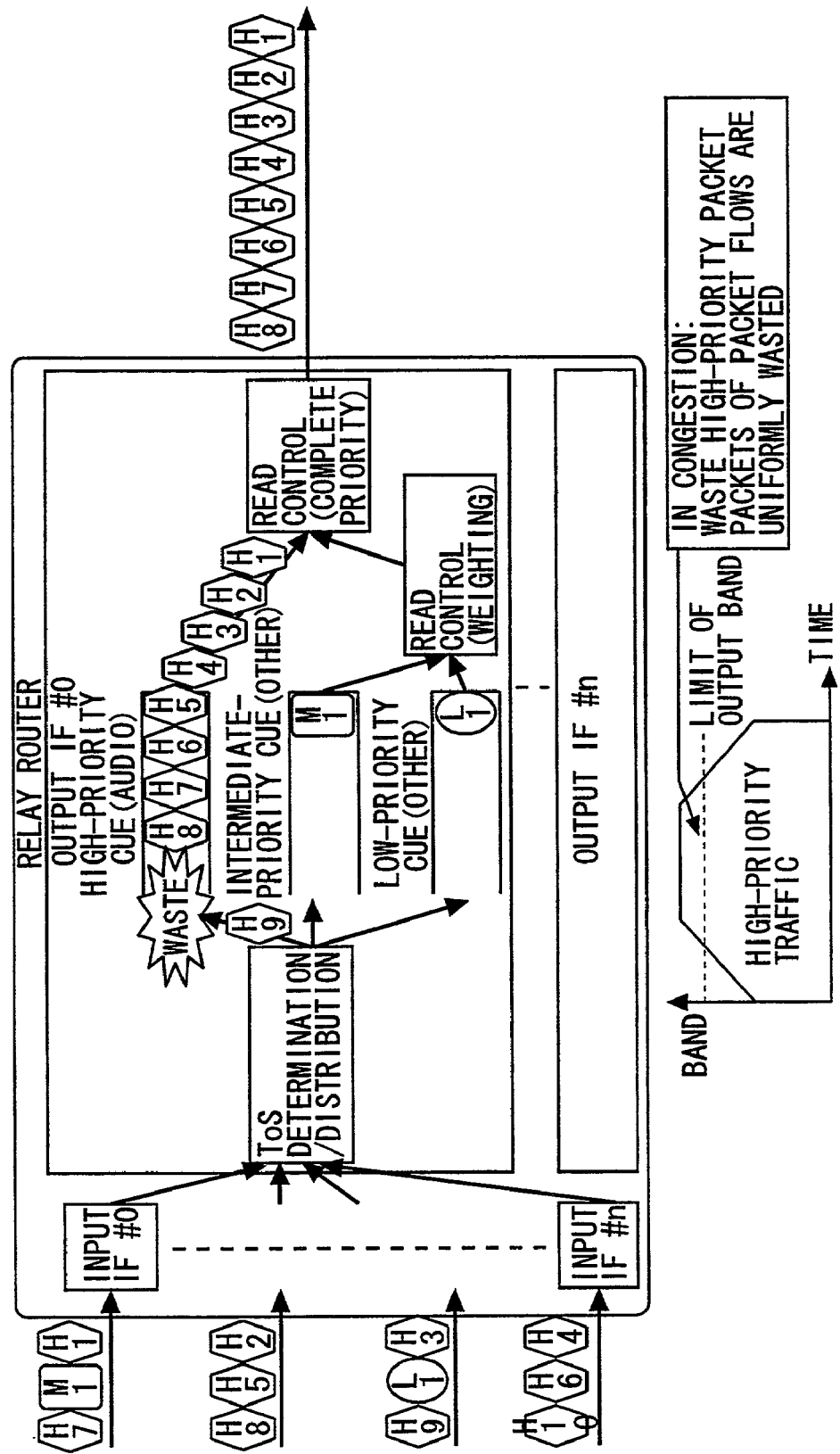
FIG. 24 is a diagram showing a problem in VoIP priority control executed by a conventional Diff-serv.
Figure 25:
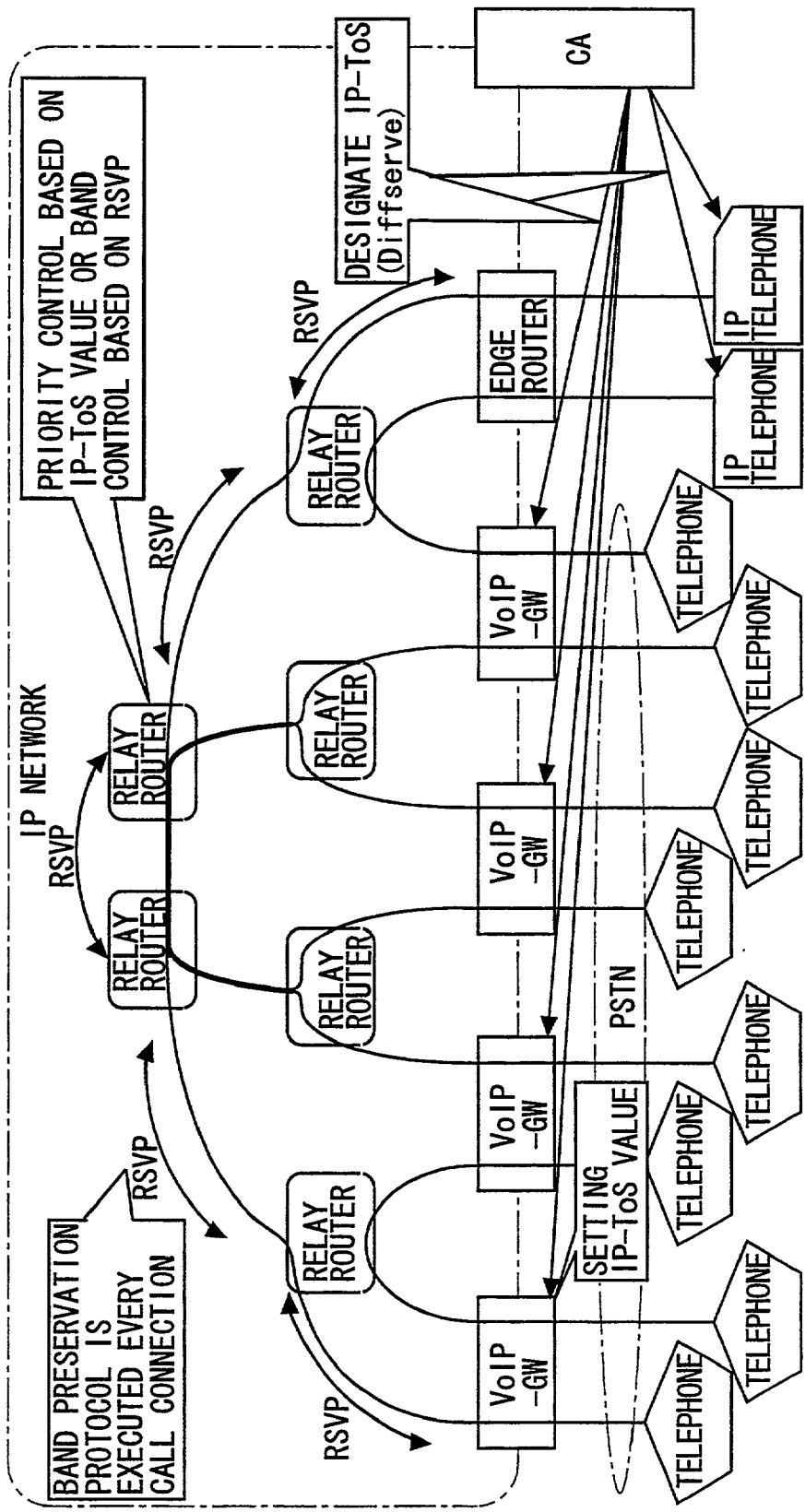
FIG. 25 is a diagram showing a QoS control in a conventional VoIP network.

An IP network using this method can provide high-quality communication having quality equal to a band-certified communication using STM exchange serving as a conventional method in audio telephonic communication and best effort communication depending on selection (see FIG. 21).

What is claimed is:

1. A congestion control system for a VoIP network comprising:

first and second VoIP gateways to generate at least one packet flow on the IP network, wherein the at least one packet flow is generated between the first VoIP gateway and the second VoIP gateway to establish a telephonic communication call between users;

a relay router including to a plurality of queues, storing packets of packet flows, each of which passes through the relay router and has a priority, in one of the plurality of queues corresponding the priority and forwarding packets stored in the plurality of queues according to the priority, when a new packet flow that passes through the relay router and has a predetermined priority is generated between the first and second VoIP gateways, the relay router judging whether the new packet flow causes congestion in the relay router, if it is judged that the new packet flow causes the congestion, the relay router transmitting a congestion notice relating to the new packet flow; and a control device for the first and second VoIP gateways to receive the congestion notice from the relay router or the relay router via any one of the first and second VoIP gateways and to execute congestion control with respect to the new packet flow to avoid storing packets of the new packet flow in one of the plurality of queues corresponding to the predetermined priority in the relay router when a reception frequency of the congestion notice reaches a predetermined value.

2. A congestion control system for an IP network comprising:

first and second VoIP gateways to generate at least one packet flow on the IP network, wherein the at least one packet flow is generated between the first VoIP gateway and the second VoIP gateway to establish a telephonic communication call between users; and a relay router including to a plurality of queues, storing packets of packet flows, each of which passes through the relay router and has a priority, in one of the plurality of queues corresponding the priority and forwarding packets stored in the plurality of queues according to the priority, when a new packet flow that passes through the relay router and has a predetermined priority is generated between the first and second VoIP gateways, the relay router judging whether the new packet flow will cause congestion in the relay router, if it is judged that the new packet flow will cause the congestion, the relay router transmitting a congestion notice relating to the new packet flow, at least one of the first and second VoIP gateways receiving the congestion notice from the relay router and executing congestion control with respect to the new packet flow to avoid storing packets of the new packet flow in one of the plurality of the plurality of queues corresponding to the predetermined priority in the relay router when a reception frequency of the congestion notice reaches a predetermined value.

3. The congestion control system for an IP network according to claim 1, wherein the control device controls at least one of the first and second VoIP gateways based on the congestion notice to change the priority of the new packet flow into a priority lower than the predetermined priority.

4. The congestion control system for an IP network according to claim 1, wherein the control device controls at least one of the first and second VoIP gateways based on the congestion notice to disconnect the new packet flow.

5. The congestion control system for an IP network according to claim 2, wherein at least one of the first and second VoIP gateways changes the priority of the new packet flow into a priority lower than the predetermined priority based on the congestion notice.

6. The congestion control system for an IP network according to claim 2, wherein
at least one of the first and second VoIP gateways disconnects the new packet flow based on the congestion notice.

7. The congestion control system for an IP network according to claim 1, wherein the relay router holds a sum total of used bands for one or more packet flows each passing through the relay router and each having the predetermined priority, and judges that the new packet flow causes the congestion when the sum total exceeds a predetermined allowable value by adding a used band of the new packet flow.

8. The congestion control system for an IP network according to claim 7, wherein the relay router comprises:
a flow specifying information storage to register flow specifying information for specifying a packet flow which passes through the relay router and has the predetermined priority;
a sum total storage to store a sum total of used bands of one or more packet flows registered in the flow specifying information storage; and
an allowable value storage to store an allowable value of a band available for packet flows each having the predetermined priority in the relay router, and
wherein when the relay router receives a packet of the new packet flow, the relay router specifies a priority of the new packet flow, when the specified priority is the predetermined priority, the relay router refers to the flow specifying information storage, and when the flow specifying information of the new packet flow is not registered in the flow specifying information storage me*, the relay router calculates a used band of the new packet flow, adds the calculated band value to the sum total stored in the sum total storage, and judges whether the adding result exceeds the allowable value stored in the allowable value storage or not.

9. The congestion control system for an IP network according to claim 8, wherein, when the relay router judges that the addition result does not exceed the allowable value stored in the allowable value storage, the relay router registers the flow specifying information of the new packet flow in the flow specifying information storage, and stores the addition result in the sum total storage as a new sum total.

10. The congestion control system for an IP network according to claim 7, wherein
when the relay router receives a packet of the new packet flow, if the packet is an audio packet, the relay router calculates a used band of the new packet flow for the audio packet on the basis of an RTP payload type and an IP packet length included in the audio packet.

11. The congestion control system for an IP network according to claim 8, wherein when changing the priority or disconnecting is executed with regard to a packet flow registered in the flow specifying information storage, the relay router deletes the flow specifying information of the packet flow from the flow specifying information storage and subtracts the value of the used band of the packet flow from the sum total stored in the sum total storage.

12. The congestion control system for an IP network according to claim 8, wherein the relay router checks whether the relay router receives a packet of each of the one or more packet flows registered in the flow specifying information storage means within a predetermined period of time or not, deletes the flow specifying information of a packet flow in the one or more packet flows in which a packet is not received within the predetermined period of time from the flow specifying information storage, and subtracts the value of the used band of the packet flow from the sum total stored in the sum total storage.

13. The congestion control system for an IP network according to claim 1, wherein when it is judged that the new packet flow causes the congestion in the relay router, and one of the first and second VoIP gateways gives an inquiry to a user of the new packet flow and executes one of changing the priority of the new packet flow into a priority lower than the predetermined priority and disconnecting the new packet flow on the basis of a reply to the inquiry from the user.

14. The congestion control system for an IP network according to claim 13, wherein
when, as new packet flows, a first packet flow and a second packet flow each passing through the relay router and each having the predetermined priority are generated between the first VoIP gateway and the second VoIP gateway, and when the relay router judges that at least one of the first packet flow and the second packet flow causes the congestion in the relay router, the first VoIP gateway gives an inquiry to a user of the first packet flow and executes one of changing the priority of the first packet flow into a priority lower than the predetermined priority and disconnecting the first packet flow on the basis of a reply to the inquiry from the user, and
wherein the second VoIP gateway receives control contents indicating one of the changing and the discontinuing executed by the first VoIP gateway and executes one of changing the priority of the second packet flow into a priority lower than the predetermined priority and disconnecting the second packet flow on the basis of the control contents.

15. The congestion control system for an IP network according to claim 3, wherein when, as new packet flows, a first packet flow and a second packet flow each passing through the relay router and each having the predetermined priority are generated between the first VoIP gateway and the second VoIP gateway, the relay router judges whether at least one of the first packet flow and the second packet flow causes the congestion in the relay router,
and wherein the control device, when receiving congestion notices with respect to both of the first packet flow and the second packet flow bases on judging results the relay router, controls at least one of the first VoIP gateway and the second VoIP gateway to change the priority of at least one of the first packet flow and the second packet flow into a priority lower than the predetermined priority.

16. The congestion control system for an IP network according to claim 4, wherein when, as new packet flows, a first packet flow and a second packet flow each passing through the relay router and each having the predetermined priority are generated between the first VoIP gateway and the second VoIP gateway, the relay router judges whether at least one of the first packet flow and the second packet flow causes the congestion in the relay router,
and wherein the control device, when receiving congestion notices with respect to both of the first packet flow and the second packet flow based on judging results of the relay router, controls at least one of the first VoIP gateway and the second VoIP gateway to disconnect at least one of the first packet flow and the second packet flow.

17. The congestion control system for an IP network according to claim 5, wherein when, as new packet flows, a first packet flow and a second packet flow each passing through the relay router and each having the predetermined priority are generated between the first VoIP gateway and the second VoIP gateway, the relay router judges whether at least one of the first packet flow and the second packet flow causes the congestion in the relay router, and wherein, at least one of the first and second VoIP gateways, when receiving congestion notices with respect to both of the first packet flow and the second packet flow based on the judging results of the relay router, changes the priority of at least one of the first packet flow and the second packet flow into a priority lower than the predetermined priority.

18. The congestion control system for an IP network according to claim 6, wherein when, as new packet flows, a first packet flow and a second packet flow each passing through the relay router and each having the predetermined priority are generated between the first VoIP gateway and the second VoIP gateway, the relay router judges whether at least one of the first packet flow and the second packet flow causes the congestion in the relay router, and wherein at least one of the first and second VoIP gateways, when receiving congestion notices with respect to both of the first packet flow and the second packet flow based on judging results of the relay router, disconnects at least one of the first packet flow and the second packet flow.

19. A system for setting audio packet flows on an IP network comprising:
   first and second VoIP gateways to generate a first packet flow that audio packets are transferred from the first VoIP gateway to the second VoIP gateway and the second packet flow that audio packets are transferred from the second VoIP gateway to the first VoIP gateway on the VoIP network;
   a relay router through which the first and second packet flows pass, the relay router receiving and forwarding packets of the first and second packet flows,
   wherein the first VoIP gateway transmits a test packet including priority information indicating a predetermined priority to the first packet flow when the first and second packet flows are generated between the first and second VoIP gateways,
   wherein the relay router judges whether the first packet flow causes congestion in the relay router when receiving the test packet transferred on the first packet flow, if it is judged that the first packet flow causes the congestion, the relay router changes content of the priority information in the test packet, if it is judge that the first packet flow does not cause the congestion, the relay router does not change the content of the priority information,
   wherein the second VoIP gateway receives the test packet forward by the relay router and transmits the test packet to the second packet flow,
   wherein the relay router judges whether the second packet flow causes congestion in the relay router when receiving and forwarding the test packet transferred on the second packet flow, if it is judged that the second packet flow causes the congestion and the content of the priority information has not been changed, the relay router changes the content of the priority information in the test packet, if it is judged that the second packet flow does not cause the congestion, the relay router does not change the content of the priority information,
   wherein the first VoIP gateway receives the test packet forwarded by the relay router, if the priority information has been changed, the first VoIP gateway executes one of changing the priority of the first packet flow into a priority lower than the predetermined priority and disconnecting the first packet flow,
   when the second VoIP gateway changes the priority of the second packet flow into a priority lower than the predetermined priority when the priority of the first packet flow is changed, and
   wherein the second VoIP gateway disconnects the second packet flow when the first packet flow is disconnected.

20. A VoIP gateway including a computer readable recording medium having a computer program stored thereon, said computer program executing processes to control congestion on an IP network, the processes comprising:
   setting a new audio packet flow that passes through a relay router and has a predetermined priority between the VoIP gateway and a second VoIP gateway to establish a telephonic communication call through a VoIP network;
   inquiring of a user of the telephonic communication call about control contents of the new audio packet flow when the relay router judges that the new audio packet flow will cause congestion in the relay router; and
   executing one of changing the priority of the new audio packet flow into a priority lower than the predetermined priority and disconnecting the new audio packet flow according to a reply from the user in order to avoid occurrence of congestion in the relay router,
   wherein when, as control contents, one of the changing the priority and the disconnecting is executed, the VoIP gateway transmits information indicating the control contents to notify the second VoIP gateway of the control contents.

21. A VoIP gateway including a computer readable recording medium having a computer program stored thereon, said computer program executing processes to control congestion on a VoIP network, the processes comprising:
   setting for, as new audio packet flows, a first packet flow and a second packet flow between the VoIP gateway and a second VoIP gateway via a relay router to establish a telephonic communication call through a VoIP network, wherein audio packets on the first packet flow are transmitted from the VoIP gateway to the second VoIP gateway, and audio packets on the second packet flow are transmitted from the second VoIP gateway to the VoIP gateway;
   transmitting a test packet that includes a priority information indicating a predetermined priority to the first packet flow, wherein the test packet reaches the second VoIP gateway through the first packet flow, thereafter, the test packet is transmitted from the second VoIP gateway and reaches the VoIP gateway through the second packet flow, when the test packet passes through the relay router, if at least one of the first and second packet flows cause congestion in the relay router, the relay router changes content of the priority information in the test packet;
   receiving the test packet from the second packet flow; and
   executing one of changing the priority of the first packet flow into a priority lower than the predetermined priority and disconnecting the first packet flow if the content of the priority information has been changed.

22. The VoIP gateway according to the claim 21, wherein when, as control contents, one of the changing the priority of the first packet flow and the disconnecting the first packet flow is executed, the VoIP gateway transmits information indicating the control contents to notify the second VoIP gateway of the control contents, wherein the second VoIP gateway changes the priority of the second packet flow into a priority lower than the predetermined priority when the priority of the first packet flow is changed, and wherein the second VoIP gateway disconnects the second packet flow when the first packet flow is disconnected.

23. A relay router on an IP network, storing thereon a computer program executing processes to control congestion in the IP network, the processes comprising:

monitoring packet flows each of which passes through the relay router itself and has a predetermined priority; and judging, when a new packet flow which passes through the relay router itself and has a predetermined priority is established, whether the new packet flow will cause congestion in the relay router; and outputting a congestion notice relating to the new packet flow to execute any one of changing the priority of the new packet flow into a priority lower than the predetermined priority and disconnecting the new packet flow when it is judged that the new packet flow causes the congestion in the relay router in order to avoid occurrence of congestion in the relay router, wherein the relay router holds a sum total of used bands of one or more packet flows each passing through the relay router itself and having the predetermined priority, and wherein the relay router judges that the new packet flow causes the congestion in the relay router when the sum total exceeds a predetermined allowable value by adding a used band of the new packet flow.

24. The relay router according to claim 23, wherein the relay router comprises:

a flow specifying information storage to register flow specifying information for specifying a packet flow which passes through the relay router and has the predetermined priority:

a sum total storage to store a sum total of used bands of one or more packet flows registered in the flow specifying information storage; and an allowable value storage to store an allowable value, and wherein when the relay router receives a packet of the new packet flow, the relay router specifies a priority of the new packet flow, when the specified priority is the predetermined priority, the relay router refers to the flow specifically information storage, and when the flow specifying information of the new packet flow is not stored in the flow specifying information storage, the relay router calculates a used band of the new packet flow, adds the calculated band value to the sum total stored in the sum total storage, and judges whether the addition result exceed the allowable value stored in the allowable value storage or not.

25. The relay router according to claim 24, wherein, when the relay router judges that the addition result does not exceed the allowable value stored in the allowable value storage, the relay router registers the flow specifying information of the new packet flow in the flow specifying information storage, and stores the addition result in the sum total storage as a new sum total value.

26. The relay router according to claim 23, wherein when the relay router receives a packet of the new audio packet flow, if the packet is an audio packet, the relay router calculates a used band of the new packet flow for the audio packet on the basis of an RTP payload type and an IP packet length included in the audio packet.

27. The relay router according to the claim 24, wherein, when one of changing the priority and disconnecting is executed with regard to a packet flow registered in the flow specifying information storage, the relay router deletes the flow specifying information of the packet flow from the flow specifying information storage and subtracts the value of the used band of the packet flow from the sum total stored in the sum total storage.

28. The relay router according to claim 24, wherein the relay router checks whether the relay router receives a packet of each of the one or more packet flows registered in the flow specifying information storage within a predetermined period of time or not, deletes flow specifying information of a packet flow in the one or more packet flows in which a packet is not received within the predetermined period of time from the flow specifying information storage, and subtracts the value of the used band of the packet flow from the sum total value stored in the sum total storage.

* * * * *

UNITED STATES PATENT AND TRADEMARK OFFICE
CERTIFICATE OF CORRECTION

| | |
|---|---|
| PATENT NO. | : 7,391,765 B2 |
| APPLICATION NO. | : 10/116929 |
| DATED | : June 24, 2008 |
| INVENTOR(S) | : Yasuo Tezuka et al. |

It is certified that error appears in the above-identified patent and that said Letters Patent is hereby corrected as shown below:

Column 20, line 6: "queues corresponding the priority" should be changed to --queues corresponding to the priority--; line 35, "queues corresponding the priority" should be changed to --queues corresponding to the priority--.

Column 21, line 36: "me*, the relay router calculates" should be changed to --, the relay router calculates--.

Signed and Sealed this

Twenty-third Day of December, 2008

JON W. DUDAS
*Director of the United States Patent and Trademark Office*